(12) United States Patent
Sone et al.

(10) Patent No.: US 12,487,741 B1
(45) Date of Patent: Dec. 2, 2025

(54) INFORMATION PROCESSING APPARATUS AND CONTROL METHOD

(71) Applicant: Lenovo (Singapore) Pte. Ltd., Singapore (SG)

(72) Inventors: Yuichi Sone, Kanagawa (JP); Yoshinori Ito, Kanagawa (JP)

(73) Assignee: Lenovo (Singapore) Pte. Ltd., Republic of (SG)

( * ) Notice: Subject to any disclaimer, the term of this patent is extended or adjusted under 35 U.S.C. 154(b) by 0 days.

(21) Appl. No.: 18/975,531

(22) Filed: Dec. 10, 2024

(30) Foreign Application Priority Data

May 30, 2024 (JP) .................................. 2024-088002

(51) Int. Cl.
| | |
|---|---|
| *G06F 3/0486* | (2013.01) |
| *G06F 1/16* | (2006.01) |
| *G06F 3/0482* | (2013.01) |
| *G06F 3/0488* | (2022.01) |
| *G09G 3/00* | (2006.01) |

(52) U.S. Cl.
CPC .......... *G06F 3/0486* (2013.01); *G06F 1/1616* (2013.01); *G06F 1/1677* (2013.01); *G06F 3/0488* (2013.01); *G06F 3/0482* (2013.01); *G06F 2203/04803* (2013.01); *G09G 3/035* (2020.08)

(58) Field of Classification Search
CPC .... G06F 3/0488; G06F 3/0486; G06F 3/0482; G06F 3/04817; G06F 1/1647; G06F 1/1652; G06F 1/1616; G06F 1/1641; G06F 2203/04803; G06F 1/1677; G06F 2340/0424; G06F 2340/0492; G09G 3/035; G09G 2340/0424; G09G 2340/0492; G09G 2354/00

USPC ........................................................ 345/173
See application file for complete search history.

(56) References Cited

U.S. PATENT DOCUMENTS

| | | | |
|---|---|---|---|
| 2014/0089833 A1* | 3/2014 | Hwang ............... | G06F 3/04886 715/780 |
| 2016/0139760 A1* | 5/2016 | Xu ....................... | G06F 3/0486 715/769 |
| 2017/0249070 A1* | 8/2017 | Chen ..................... | G06F 3/0484 |
| 2024/0257684 A1* | 8/2024 | Ito ......................... | G06F 1/1652 |

FOREIGN PATENT DOCUMENTS

JP 7440672 B1 2/2024

\* cited by examiner

*Primary Examiner* — Jimmy H Nguyen
(74) *Attorney, Agent, or Firm* — Osha Bergman Watanabe & Burton LLP

(57) ABSTRACT

An information processing apparatus includes a bendable display, a touch sensor configured to detect a touch operation on a screen area of the display, and a processor configured to perform control of arranging and displaying a window of a running application on the screen area of the display, and performs: an icon display process of displaying, in response to a drag operation being started on the window displayed on the screen area of the display, an icon for accepting an operation based on an operation position of the drag operation while continuing the drag operation on the screen area of the display, an icon display end process of ending display of the icon when the drag operation is completed on the window, and an icon display continuation process of continuing the display of the icon when the drag operation is completed on the window but is only temporarily interrupted.

10 Claims, 12 Drawing Sheets

INFORMATION PROCESSING APPARATUS AND CONTROL METHOD

CROSS-REFERENCE TO RELATED APPLICATIONS

This application claims priority to Japanese Patent Application No. 2024-088002 filed on May 30, 2024, the contents of which are hereby incorporated herein by reference in their entirety.

BACKGROUND OF THE INVENTION

Field of the Invention

The present invention relates to an information processing apparatus and a control method.

Description of the Related Art

For example, Japanese Patent No. 7440672 discloses an information processing apparatus having a display (flexible display) that can be bent over first and second chassis, which can be rotated by a hinge mechanism, and can be used with the first and second chassis in a bent form or in a flat form like a tablet type, depending on the user's use. In addition, the display of the information processing apparatus disclosed in Japanese Patent No. 7440672 is provided with a touch sensor that detects touch operations on the screen area of a display.

SUMMARY OF THE INVENTION

An information processing apparatus having a touch-operable display allows a user to operate directly against the screen, and thus operability is good. However, as described above, if the first and second chassis can be used in a bent form (that is, the screen of a display is in a bent form) or in a flat form (that is, the screen of a display is in a flat form), when the screen is in a flat form, it is easy to operate, but when the screen is in a bent form, it may be difficult to operate against the screen at a place where the screen is bent. For example, when performing a drag operation with a finger against the screen, the dragging finger will not unintentionally lift off the screen when the screen is in a flat form, but the finger may unintentionally lift off the screen at a place where the screen is bent. It may be difficult to operate at a place where the screen is bent, especially when performing other operations while dragging.

The present invention has been made in view of the above circumstances, and an object of the present invention is to provide an information processing apparatus with improved operability for the screen of a bendable display (flexible display), and a control method.

The present invention has been made in order to solve the above-described problems, and an information processing apparatus according to the first aspect of the present invention includes a bendable display, a touch sensor configured to detect a touch operation on a screen area of the display, a memory configured to store a program of an application, and a processor configured to perform control of arranging and displaying a window of a running application on the screen area of the display by executing the program of the application stored in the memory, in which the processor is configured to perform: an operation information acquisition process of acquiring operation information based on a detection result of the touch sensor, an icon display process of displaying, in response to a drag operation being started on the window displayed on the screen area of the display, an icon for accepting an operation based on an operation position of the drag operation while continuing the drag operation on the screen area of the display, an icon display end process of ending display of the icon when the drag operation is completed on the window, and an icon display continuation process of continuing the display of the icon when the drag operation is completed on the window but is only temporarily interrupted.

In the information processing apparatus, the processor may perform a determination process of determining whether or not the display is in a bent form, when it is determined by the determination process that the display is not in the bent form, not execute the icon display continuation process, and end the display of the icon in response to completion of the drag operation on the window, regardless of whether or not the drag operation is temporarily interrupted by the icon display end process, and when it is determined by the determination process that the display is in the bent form, execute the icon display continuation process to continue the display of the icon until a predetermined time elapses after the drag operation is completed even when the drag operation is completed on the window and to end the display of the icon when the drag operation is not resumed after the predetermined time elapses.

In the information processing apparatus, the processor may change the predetermined time based on a bending angle of the display that is in the bent form.

In the information processing apparatus, the processor may control whether or not to execute the icon display continuation process based on a position at which the display is bendable and a current position of the drag operation.

In the information processing apparatus, in the icon display process, the processor may display the icon at a position based on a start position of the drag operation, and control whether or not to execute the icon display continuation process based on a position at which the display is bendable and the start position of the drag operation.

In the information processing apparatus, in the icon display process, the processor may display the icon at a position based on a start position of the drag operation, and control whether or not to execute the icon display continuation process based on a position at which the display is bendable, and the start position and an operation direction of the drag operation.

In the information processing apparatus, while the display of the icon is continued by the icon display continuation process, when an operation is performed on a window different from the window on which the drag operation is performed when the icon is displayed, the processor may end the display of the icon of which the display is continued.

In the information processing apparatus, the processor may perform control of arranging and displaying the window on a screen area of a plurality of displays including an embedded display provided in the information processing apparatus as the display and an external display connected to the information processing apparatus, and in the icon display process, display a first icon for accepting an operation of selecting a display for displaying the window, from among the plurality of displays, as the icon.

In the information processing apparatus, in the icon display process, the processor may display a second icon from which a display area is selectable for displaying the window within a screen area of a display selected based on the operation on the first icon, as the icon.

In addition, a control method according to the second aspect of the present invention in an information processing apparatus including a bendable display, a touch sensor configured to detect a touch operation on a screen of the display, a memory configured to store a program of an application, and a processor configured to perform control of arranging and displaying a window of a running application on a screen area of the display by executing the program of the application stored in the memory, the method including: via the processor, a step of acquiring operation information based on a detection result of the touch sensor; a step of displaying, in response to a drag operation being started on the window displayed on the screen area of the display, an icon for accepting an operation based on an operation position of the drag operation while continuing the drag operation on the screen area of the display; a step of ending display of the icon when the drag operation is completed on the window; and a step of continuing the display of the icon when the drag operation is completed on the window but is only temporarily interrupted.

The above-described aspects of the present invention can improve the operability for the screen of a bendable display (flexible display).

DETAILED DESCRIPTION OF THE INVENTION

Hereinafter, embodiments of the present invention will be described with reference to the accompanying drawings.

First Embodiment

[Appearance of Information Processing Apparatus]

Figure 1:
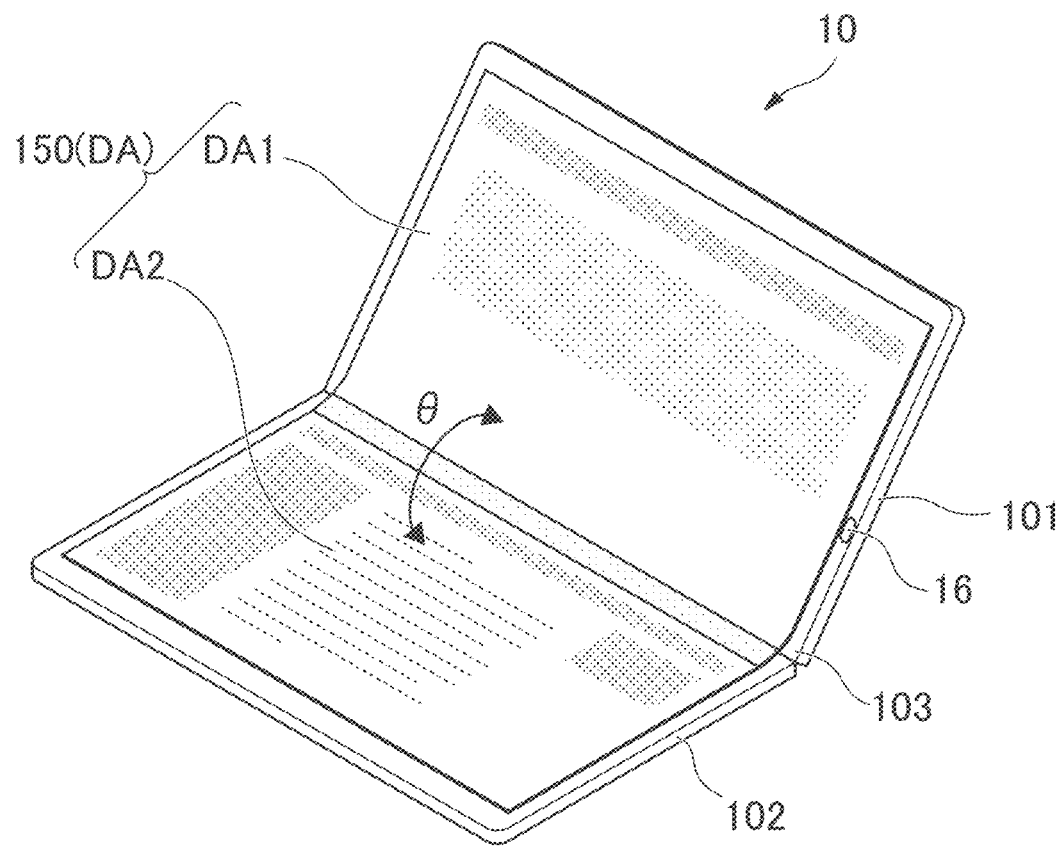
FIG. 1 is a perspective view illustrating an appearance of an information processing apparatus according to a first embodiment.

FIG. 1 is a perspective view illustrating the appearance of an information processing apparatus 10 according to the present embodiment. The information processing apparatus 10 according to the present embodiment is a clamshell (laptop) personal computer (PC). The information processing apparatus 10 is provided with a first chassis 101, a second chassis 102, and a hinge mechanism 103. The first chassis 101 and the second chassis 102 are chassis having a substantially quadrangular plate shape (for example, flat plate shape). One of side surfaces of the first chassis 101 and one of side surfaces of the second chassis 102 are coupled (connected) via the hinge mechanism 103, and the first chassis 101 and the second chassis 102 are relatively rotatable around a rotation axis formed by the hinge mechanism 103. A state in which an opening angle θ around the rotation axis of the first chassis 101 and the second chassis 102 is about 0° is a state in which the first chassis 101 and the second chassis 102 overlap with each other and are closed. A state in which the first chassis 101 and the second chassis 102 are closed will be referred to as a "closed state". In the closed state, surfaces of the first chassis 101 and the second chassis 102 facing each other will be referred to as the respective "inner surfaces", and surfaces opposite to the inner surfaces will be referred to as "outer surfaces". The opening angle θ can also be referred to as an angle formed by the inner surface of the first chassis 101 and the inner surface of the second chassis 102. A state in which the first chassis 101 and the second chassis 102 are opened with respect to the closed state will be referred to as an "open state". The open state is a state in which the first chassis 101 and the second chassis 102 are relatively rotated until the opening angle θ exceeds a preset threshold value (for example, 10°).

The information processing apparatus 10 is provided with a camera 16 and a display 150. The camera 16 is provided on the inner surface of the first chassis 101. The display 150 is provided over the inner surface of the first chassis 101 and the inner surface of the second chassis 102. The camera 16 is provided in, for example, an outer portion of a screen area of the display 150 on the inner surface of the first chassis 101, and can image a user or the like who exists on the side facing the display 150. The display 150 is a flexible display that can be bent according to the opening angle θ due to the relative rotation of the first chassis 101 and the second chassis 102 (see FIGS. 2 and 3). An organic EL display or the like is used as the flexible display. The information processing apparatus 10 can control display of an entire screen area of the display 150 as one display area DA in a one-screen configuration, and can also control display by splitting the entire screen area of the display 150 into two display areas, a first display area DA1 and a second display area DA2, in a two-screen configuration. Here, the first display area DA1 and the second display area DA2 are the display areas that do not overlap with each other. Here, among the screen areas of the display 150, a display area corresponding to the inner surface side of the first chassis 101 is defined as the first display area DA1, and a display area corresponding to the inner surface side of the second chassis 102 is defined as the second display area DA2. In the following description, a display mode in which display is controlled with the one-screen configuration will be referred to as a "one-screen mode", and a display mode in which display is controlled with the two-screen configuration will be referred to as a "two-screen mode".

A touch sensor is provided on the screen area of the display 150. The information processing apparatus 10 can detect a touch operation on the screen area of the display 150. By bringing the information processing apparatus 10 into an open state, the user can visually recognize display of the display 150 provided on the inner surface of each of the first chassis 101 and the second chassis 102, or can perform the touch operation on the display 150, and thus can use the information processing apparatus 10.

Hereinafter, a usage form and the screen mode of the information processing apparatus 10 will be described in detail. First, the usage forms of the information processing apparatus 10 are classified into a bent form in which the first chassis 101 and the second chassis 102 are bent according to the opening angle θ between the first chassis 101 and the second chassis 102, and a flat form in which the first chassis 101 and the second chassis 102 are not bent. In the following description, the bent form in which the first chassis 101 and the second chassis 102 are bent will be simply referred to as a "bent form", and the flat form in which the first chassis 101 and the second chassis 102 are not bent will be simply referred to as a "flat form". In the bent form, the display 150 provided over the first chassis 101 and the second chassis 102 is also in the bent form. In the flat form, the display 150 is also in the flat state.

Figure 2:
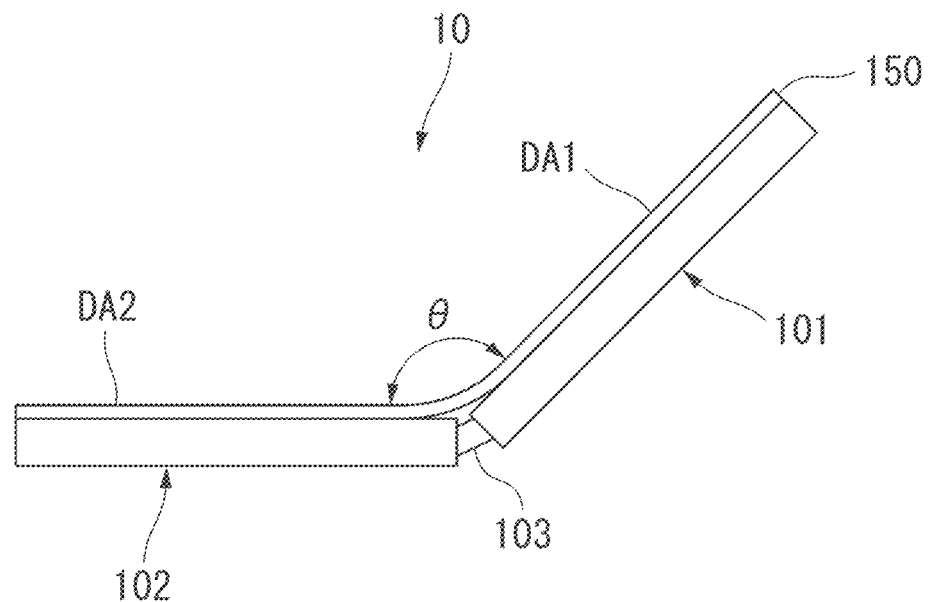
FIG. 2 is a side view illustrating an example of the information processing apparatus in a bent form according to the first embodiment.

FIG. 2 is a side view illustrating an example of the information processing apparatus 10 in the bent form. The display 150 is arranged over (across) the first chassis 101 and the second chassis 102. The screen area (display area DA illustrated in FIG. 1) of the display 150 can be folded (bent) with a portion corresponding to the hinge mechanism 103 as a crease, and the display area on the first chassis 101 side is illustrated as the first display area DA1 and the display area on the second chassis 102 side is illustrated as the second display area DA2 with the crease as a boundary. The display 150 is bent according to the rotation (opening angle θ) of the first chassis 101 and the second chassis 102. It is determined whether or not the information processing apparatus 10 is in the bent form according to the opening angle θ. As an example, in a case in which 10°<θ<170°, it is determined that the information processing apparatus 10 is in the bent form. This state corresponds to the usage form such as a so-called clamshell mode or book mode.

Figure 3:
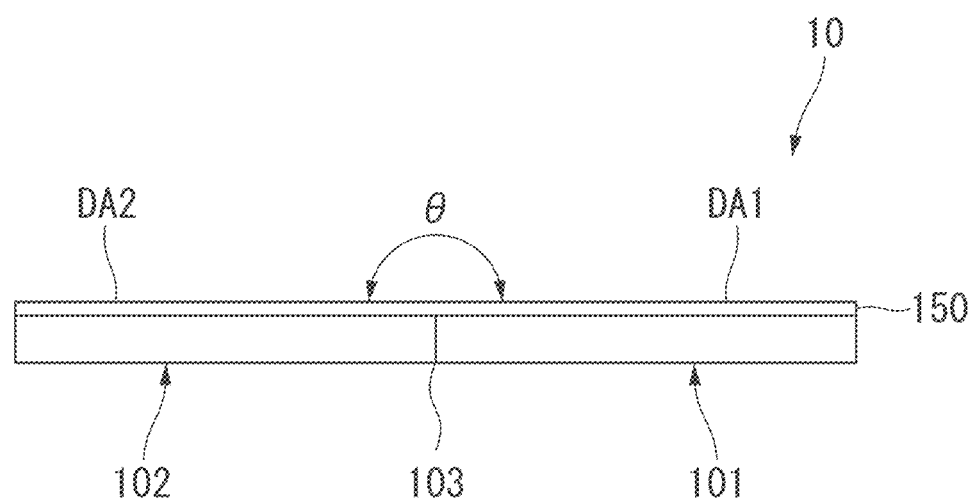
FIG. 3 is a side view illustrating an example of the information processing apparatus in a flat form according to the first embodiment.

FIG. 3 is a side view illustrating an example of the information processing apparatus 10 in a flat form. It is typically determined that the information processing apparatus 10 is in the flat form in a case in which the opening angle θ is 180°, but as an example, it may be determined that the information processing apparatus 10 is in the flat form in a case in which 170°≤θ≤180°. For example, in a case in which the opening angle θ between the first chassis 101 and the second chassis 102 is 180°, the display 150 is also in the flat state. This state corresponds to the usage form called a so-called tablet mode.

[Description of Display Mode]

Hereinafter, the display modes according to various usage forms of the information processing apparatus 10 will be described in detail with reference to FIG. 4.

Figure 4:
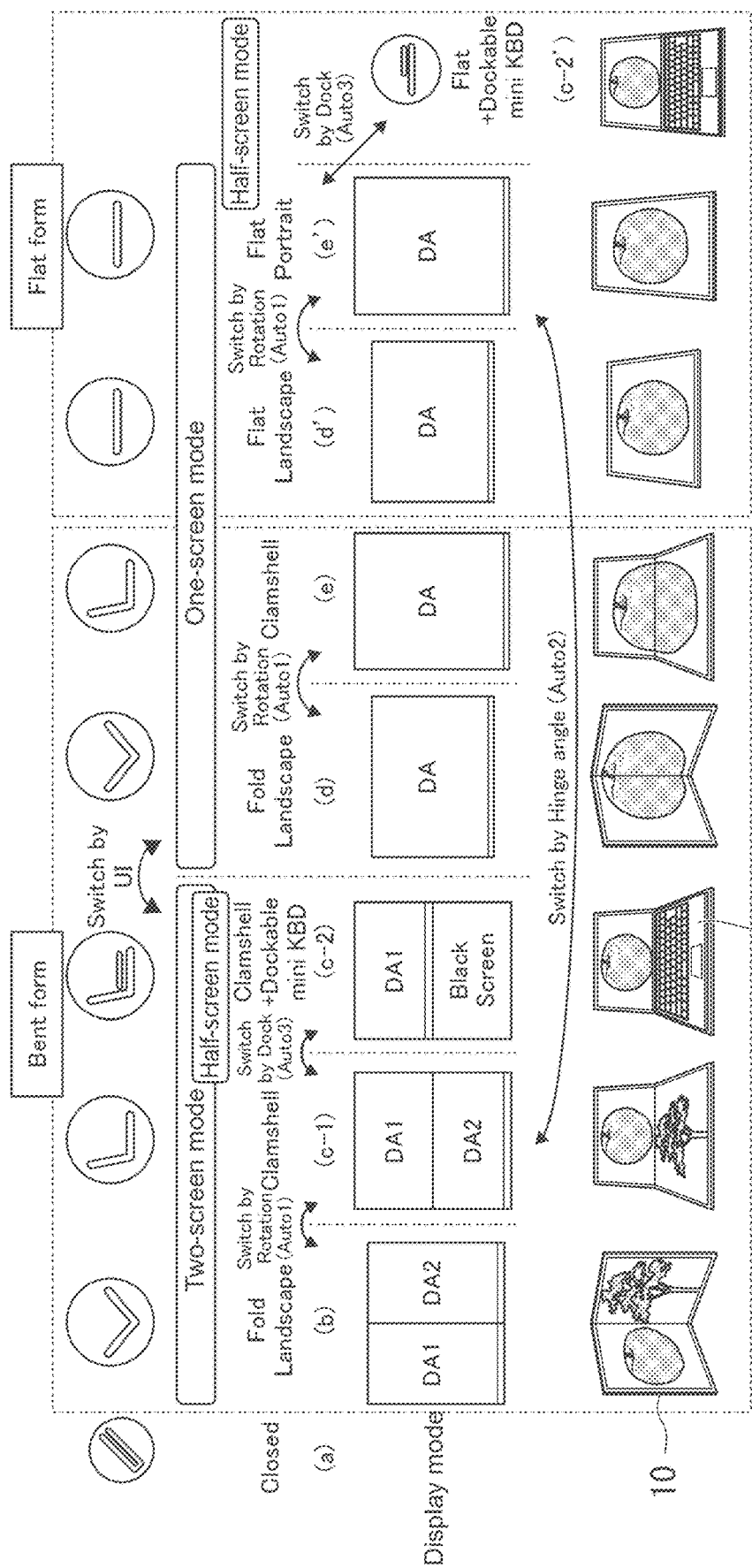
FIG. 4 is a view illustrating specific examples of various display modes of the information processing apparatus according to the first embodiment.

FIG. 4 is a view illustrating specific examples of various display modes of the information processing apparatus 10 according to the present embodiment. The information processing apparatus 10 has different display modes according to the usage forms classified according to the opening angle θ between the first chassis 101 and the second chassis 102, a posture (orientation) of the information processing apparatus 10, whether the one-screen mode is used or the two-screen mode is used, and the like. The one-screen will also be called a single screen, and the two-screen will also be called a split screen, a dual screen, or the like.

A display mode (a) when the first chassis 101 and the second chassis 102 are in the closed state (Closed) as the usage form. In this closed state, the information processing apparatus 10 is, for example, in a standby state such as a sleep or suspended state (hibernation), and the display 150 is in a display-off state. The standby state such as the sleep or suspended state (hibernation) corresponds to S3 or S4 of a power supply state of a system defined by, for example, an advanced configuration and power interface (ACPI).

A display mode (b) is a display mode when the usage form is the bent form, and the two-screen mode is used in which display is controlled such that the screen area of the display 150 is split into the two display areas, the first display area DA1 and the second display area DA2. The orientation of the information processing apparatus 10 is a portrait orientation such that the first display area DA1 and the second display area DA2 are in a portrait orientation and are horizontally arranged from side to side. The portrait orientation of the display area is an orientation in which a long side of four sides of a rectangular display area is in a vertical direction and a short side is in a horizontal direction. In a case in which the display area is in the portrait orientation, a display orientation is also the portrait orientation, and display is performed in an orientation in which a direction along the long side corresponds to an up-down direction and a direction along the short side corresponds to a left-right direction. This usage form is a usage form in which left and right pages when a book is opened correspond to left and right screens, and corresponds to the so-called book mode. This usage form will also be referred to as a "Fold Landscape" because the usage form is the bent form, the first display area DA1 and the second display area DA2 are arranged side by side, and the display area obtained by combining the first display area DA1 and the second display area DA2 is horizontally long.

In this display mode (b), for example, in a normal operation state, the information processing apparatus 10 is in the two-screen display mode in which the first display area DA1 on the left side is used as a primary screen and the second display area DA2 on the right side is used as a secondary screen. In the display mode (b), a correspondence relationship between the first display area DA1 and the second display area DA2, and the primary screen and the secondary screen may be reversed.

As in the display mode (b), a display mode (c-1) is a display mode when the usage form is the bent form, and the two-screen mode is used in which display is controlled such that the screen area of the display 150 is split into two display areas, the first display area DA1 and the second display area DA2, but an orientation of the information processing apparatus 10 is different. The orientation of the information processing apparatus 10 is a portrait orientation such that the first display area DA1 and the second display area DA2 are arranged vertically, up and down in a landscape orientation. The landscape orientation of the display area is an orientation in which a long side of four sides of a rectangular display area is in a horizontal direction and a short side is in a vertical direction. In a case in which the display area is in the landscape orientation, a display orientation is also the landscape orientation, and display is performed in an orientation in which a direction along the short side corresponds to an up-down direction and a direction along the long side corresponds to a left-right direction. This usage form is one of general usage forms of a clamshell PC.

In this display mode (c-1), for example, in a normal operation state, the information processing apparatus 10 is in the two-screen display mode in which the first display area DA1 is used as a primary screen and the second display area DA2 is used as a secondary screen. In the display mode (c-1), a correspondence relationship between the first display area DA1 and the second display area DA2, and the primary screen and the secondary screen may be reversed.

For example, the information processing apparatus 10 detects a change in the posture (orientation) of the information processing apparatus 10, and thus automatically performs switching from the display mode (b) to the display mode (c-1) or from the display mode (c-1) to the display mode (b) (Switch by Rotation). For example, since the display mode (c-1) is a state in which the display 150 is rotated 90 degrees rightward with respect to the display mode (b) as illustrated, when the rightward rotation from a state of the display mode (b) by a predetermined angle (for example, 45 degrees) or more is detected, the information processing apparatus 10 performs the switching to the display mode (c-1). Since the display mode (b) is a state in which the display 150 is rotated 90 degrees leftward with respect to the display mode (c-1) as illustrated, when the leftward rotation from a state of the display mode (c-1) by a predetermined angle (for example, 45 degrees) or more is detected, the information processing apparatus 10 performs the switching to the display mode (b).

As in the display mode (c-1), in a display mode (c-2), the bent form is used and the orientation of the information processing apparatus 10 is the same, but there is a difference in that an external keyboard 30 (Dockable mini Keyboard (KBD)) that can be connected to the information processing apparatus 10 is connected. This usage form is a state in which the physical keyboard 30 is connected in a general usage form of a clamshell PC. For example, the keyboard 30 has almost the same size as the second display area DA2, and can be placed on the second display area DA2. As an example, the keyboard 30 is provided with a magnet in an inner portion (end portion) of a bottom surface, and when the keyboard 30 is placed on the second display area DA2, the keyboard 30 is attracted and fixed to a metal portion of an end portion on the inner surface of the second chassis 102. As a result, the usage form is the same as the usage form of a conventional clamshell PC that is originally provided with the physical keyboard. In addition, the information processing apparatus 10 and the keyboard 30 are connected by, for example, Bluetooth (registered trademark). In this display mode (c-2), the information processing apparatus 10 controls the second display area DA2 to be displayed black or turned off because the second display area DA2 cannot be visually recognized due to the keyboard. In other words, this display mode (c-2) is a display mode (hereinafter, referred to as a "half-screen mode") in which only half screen is valid for display, and is the one-screen mode using only the first display area DA1.

For example, when the information processing apparatus 10 detects the connection with the external keyboard in a state of the display mode (c-1), the information processing apparatus 10 automatically performs the switching from the display mode (c-1) to the display mode (c-2) (Switch by Dock).

As in the display mode (b), in a display mode (d), the bent form is used and the orientation of the information processing apparatus 10 is the same, but there is a difference in that the display mode (d) is the one-screen mode in which display is controlled such that the entire screen area of the display 150 is used as one display area DA. This usage form is different from the display mode (b) in that the one-screen mode is used, but will also be referred to as the "Fold Landscape" because the bent form is used and the display area DA is horizontally long. The display area DA is in the landscape orientation, and the display orientation is also the landscape orientation.

Here, switching between the one-screen mode and the two-screen mode in the bent form can be performed, for example, by the user's operation. For example, the information processing apparatus 10 displays an operating element as a user interface (UI) that allows switching between the one-screen mode and the two-screen mode at any place on the screen, and performs the switching from the display mode (b) to the display mode (d) based on an operation on the operating element (switch by UI).

As in the display mode (c-1), in a display mode (e), the bent form is used and the orientation of the information processing apparatus 10 is the same, but there is a difference in that the display mode (e) is the one-screen mode in which display is controlled such that the entire screen area of the display 150 is used as one display area DA. This usage form is different from the display mode (c-1) in that the one-screen mode is used, but corresponds to the usage form of the clamshell PC in terms of the bent form and the orientation of the information processing apparatus 10. The display area DA is in the portrait orientation, and the display orientation is also the portrait orientation.

For example, the information processing apparatus 10 detects a change in the posture (orientation) of the information processing apparatus 10, and thus automatically performs switching from the display mode (d) to the display mode (e) or from the display mode (e) to the display mode (d) (Switch by Rotation). For example, since the display mode (e) is a state in which the display 150 is rotated 90 degrees rightward with respect to the display mode (d) as illustrated, when the rightward rotation from a state of the display mode (d) by a predetermined angle (for example, 45 degrees) or more is detected, the information processing apparatus 10 performs the switching to the display mode (e). Since the display mode (d) is a state in which the display 150 is rotated 90 degrees leftward with respect to the display mode (e) as illustrated, when the leftward rotation from a state of the display mode (e) by a predetermined angle (for example, 45 degrees) or more is detected, the information processing apparatus 10 performs the switching to the display mode (d).

As in the display mode (d), in a display mode (d'), the one-screen mode is used and the orientation of the information processing apparatus 10 is an orientation in which the display area DA is horizontally long, but there is a difference in that the flat form is used. The flat form is a state in which the opening angle θ between the first chassis 101 and the second chassis 102 is about 180°. This usage form corresponds to the so-called tablet mode described with reference to FIG. 3, and will also be referred to as the "Flat Landscape" because the flat form is used and the display area DA is horizontally long. This display mode (d') is different from the display mode (d) only in terms of the opening angle θ between the first chassis 101 and the second chassis 102. As in the display mode (d), the display area DA is in the landscape orientation, and the display orientation is also the landscape orientation.

As in the display mode (e), in a display mode (e'), the one-screen mode is used and the orientation of the information processing apparatus 10 is an orientation in which the display area DA is vertically long, but there is a difference in that the flat form is used. This usage form will also be referred to as a "Flat Portrait" because the flat form is used and the display area DA is vertically long. This display mode (e') is different from the display mode (e) only in terms of the opening angle θ between the first chassis 101 and the second chassis 102. As in the display mode (e), the display area DA is in the portrait orientation, and the display orientation is also the portrait orientation.

For example, the information processing apparatus 10 detects a change in the posture (orientation) of the information processing apparatus 10, and thus automatically performs switching from the display mode (d') to the display mode (e') or from the display mode (e') to the display mode (d') (Switch by Rotation). For example, since the display mode (e') is a state in which the display 150 is rotated 90 degrees rightward with respect to the display mode (d') as illustrated, when the rightward rotation from a state of the display mode (d') by a predetermined angle (for example, 45 degrees) or more is detected, the information processing apparatus 10 performs the switching to the display mode (e'). Since the display mode (d') is a state in which the display 150 is rotated 90 degrees leftward with respect to the display mode (e') as illustrated, when the leftward rotation from a state of the display mode (e') by a predetermined angle (for example, 45 degrees) or more is detected, the information processing apparatus 10 performs the switching to the display mode (d').

Here, switching between the one-screen mode and the two-screen mode in the flat form can be performed, for example, by the user's operation. For example, as described above, in the display mode (d') and the display mode (e'), the information processing apparatus 10 displays the operating element as a UI that allows switching between the one-screen mode and the two-screen mode at any place on the screen, and by the user operating this operating element, it is also possible to switch to the two-screen mode while remaining in the flat form. For example, when the switching from a state of the display mode (d') to the two-screen mode is performed, the display state is the same as the display state of the display mode (b) in the flat form. When the switching from a state of the display mode (e') to the two-screen mode is performed, the display state is the same as the display state of the display mode (c-1) in the flat form.

When the information processing apparatus 10 detects the connection with the keyboard 30 in a state of the display mode (e'), the information processing apparatus 10 automatically performs the switching from the display mode (e') to the display mode (c-2') (Switch by Dock). The display mode (c-2') is the flat form, and is different from the display mode (c-2) only in terms of the opening angle θ between the first chassis 101 and the second chassis 102. In this display mode (c-2'), the information processing apparatus 10 controls the second display area DA2 to be displayed black or turned off because the second display area DA2 cannot be visually recognized due to the keyboard. In other words, as in the display mode (c-2), this display mode (c-2') is the half-screen mode in which only one half screen is valid for display.

Further, the information processing apparatus 10 can also automatically switch from the one-screen mode to the two-screen mode by detecting a change from a flat form to a bent form (switch by hinge angle). For example, in a case in which the change to the bent form in a state of the display mode (d') is detected based on the opening angle θ between the first chassis 101 and the second chassis 102, the information processing apparatus 10 automatically performs the switching from the display mode (d') to the display mode (b). In a case in which the change to the bent form in a state of the display mode (e') is detected based on the opening angle θ between the first chassis 101 and the second chassis 102, the information processing apparatus 10 automatically performs the switching from the display mode (e') to the display mode (c-1).

Further, the information processing apparatus 10 has a function of arranging a window of an application in a desired display area within the screen area (so-called snap function), in addition to switching between display modes such as the one-screen mode and the two-screen mode described above. For example, the information processing apparatus 10 displays an operating element as a user interface (UI) from which a display area within the screen area of the display 150 can be selected, in which a window is to be arranged (laid out), and displays the window in a display area selected by the user based on the user's operation on the operating element. The UI from which the display area in which this window is to be arranged can be selected will be referred to as a "layout selection icon" below.

The layout of the display area that can be selected by operating this layout selection icon is the layout for the entire screen area (display area DA) of the display 150, regardless of whether the display mode described with reference to FIG. 4 is the one-screen mode or the two-screen mode. In addition, in the case of the half-screen mode, since half of the screen area of the display 150 is a valid screen area, the layout is for this half area.

[Example of Layout Selection Icons]

Next, a specific example of the layout selection icons will be described.

Figure 5A:
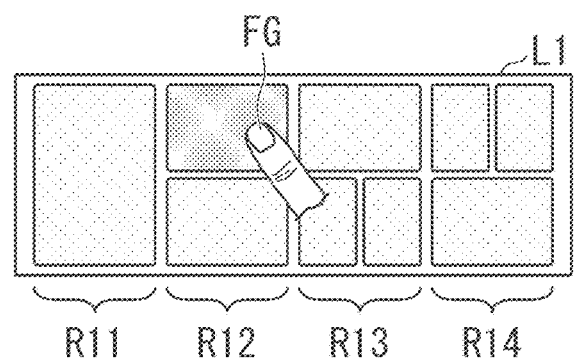
FIGS. 5(A) and 5(B) are views illustrating a display example of layout selection icons according to the first embodiment.

FIG. 5 is a view illustrating a display example of layout selection icons according to the present embodiment. FIG. 5(A) illustrates an example of a layout selection icon L1 displayed when the usage form is "Portrait (or Clamshell)" (display mode (c-1), display mode (e), display mode (e'), and the like).

In the layout selection icon L1, the portion indicated by a reference numeral R11 is a layout in which the entire screen area of the display 150 is one display area, and the entire screen area can be selected as the display area in which a window is to be arranged. The portion indicated by a reference numeral R12 is a layout in which the screen area is split into two, upper and lower, and the upper display area or the lower display area within the screen area can be selected as the display area in which a window is to be arranged. In addition, the portion indicated by a reference numeral R13 and the portion indicated by a reference numeral R14 are layouts in which the screen area is split into three. The portion indicated by the reference numeral R13 is a layout in which the lower display area, which is obtained by splitting the screen area into two, upper and lower, is further split into two, left and right. The portion indicated by the reference numeral R14 is a layout in which the upper display area, which is obtained by splitting the screen area into two, upper and lower, is further split into two, left and right. In the portion indicated by the reference numeral R13 and the portion indicated by the reference numeral R14, any one of three display areas can be selected as a display area in which a window is to be arranged.

For example, when the usage form is "Portrait (or Clamshell)", the layout selection icon L1 is displayed when the user drags a window. The layout selection icon L1 is an icon that accepts an operation based on the operation position of the drag operation while the drag operation is continued. As illustrated in the figure, when a dragging finger FG (that is, operation position) is hovered over the upper area of the layout in which the screen area is split into two parts, as indicated by the reference numeral R12, the display area corresponding to the upper area is selected. The display mode (color, brightness, or the like) of the selected area within the layout selection icon L1 is changed. When the drag operation is completed, a window is displayed in the selected upper display area.

Figure 5B:
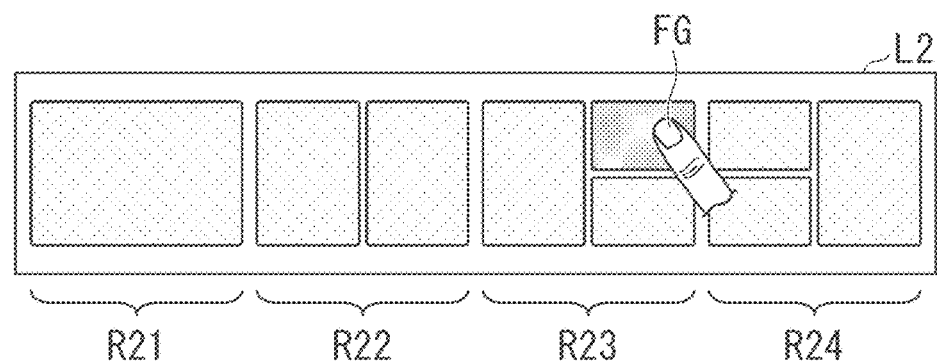

FIG. 5(B) shows an example of the layout selection icon L2 displayed when the usage form is "Landscape" (display mode (b), display mode (d), display mode (d'), and the like).

In the layout selection icon L2, the portion indicated by the reference numeral R21 is a layout in which the entire screen area of the display 150 is one display area, and the entire screen area can be selected as the display area in which a window is to be arranged. The portion indicated by a reference numeral R22 is a layout in which the screen area is split into two, left and right, and the left display area or the right display area within the screen area can be selected as the display area in which a window is to be arranged. In addition, the portion indicated by a reference numeral R23 and the portion indicated by a reference numeral R24 are layouts in which the screen area is split into three. The portion indicated by the reference numeral R23 is a layout in which the right display area, which is obtained by splitting the screen area into two, left and right, is further split into two, upper and lower. The portion indicated by the reference numeral R24 is a layout in which the left display area, which is obtained by splitting the screen area into two, left and right, is further split into two, upper and lower. In the portion indicated by the reference numeral R23 and the portion indicated by the reference numeral R24, any one of three display areas can be selected as a display area in which a window is to be arranged.

For example, when the usage form is "Landscape", the layout selection icon L2 is displayed by the user dragging a window. Similarly to the layout selection icon L1, the layout selection icon L2 is an icon that accepts an operation based on the operation position of the drag operation while the drag operation is continued. As illustrated in the figure, when the dragging finger FG (that is, operation position) is hovered over the right upper area of the layout in which the screen area is split into three parts, as indicated by the reference numeral R23, the display area corresponding to the right upper area is selected. The display mode (color, brightness, or the like) of the selected area within the layout selection icon L2 is changed. When the drag operation is completed, a window is displayed in the selected upper display area on the right side.

[Configuration of Connection with External Display]

In addition, the information processing apparatus 10 can also be used by being connected to an external display.

Figure 6:
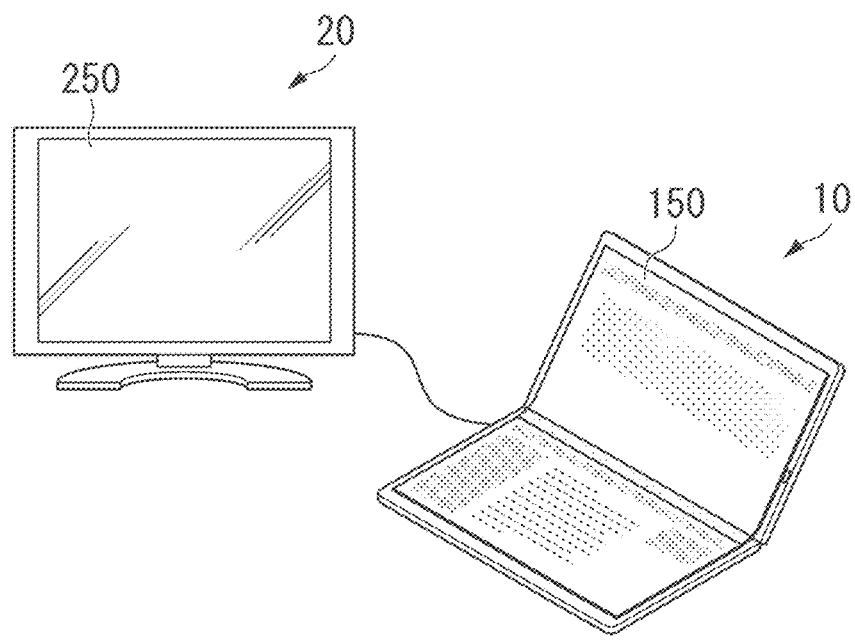
FIG. 6 is a view illustrating an example of a configuration in which the information processing apparatus according to the first embodiment is connected to an external display.

FIG. 6 is a view illustrating an example of a configuration in which the information processing apparatus 10 according to the present embodiment is connected to an external display. The information processing apparatus 10 is connected to an external display device 20 (display device). Any connection method using HDMI (registered trademark), USB Type-C, display port, or the like can be applied as a connection method. The information processing apparatus 10 may be wirelessly connected to the external display device 20. The external display device 20 is configured to include a display 250 as an external display. In contrast to an external display, the display 150 of the information processing apparatus 10 is an embedded display.

When connecting to the external display device 20 and controlling display in a plurality of screen areas (a plurality of screen areas that do not overlap with each other) between the screen area of the embedded display and the screen area of the external display, the information processing apparatus 10 can display a window on both the screen area of the embedded display and the screen area of the external display by using the layout selection icons described with reference to FIG. 5.

For example, the information processing apparatus 10 can display a window displayed in the screen area of the embedded display in any of the display areas in each layout within the screen area of the embedded display, or can display the window in any of the display areas in each layout of the external display. Similarly, the information processing apparatus 10 can display a window displayed on the screen area of the external display in any of the display areas in each layout of the external display, or in any of the display areas in each layout within the screen area of the embedded display.

When connected to the external display device 20, the information processing apparatus 10 displays a UI as an operating element for selecting which of the embedded display and the external display is to be the screen area for displaying a window before displaying the layout selection icons shown in FIG. 5. This UI will be referred to as a "display selection icon" below.

[Example of Display Selection Icons]

Figure 7:
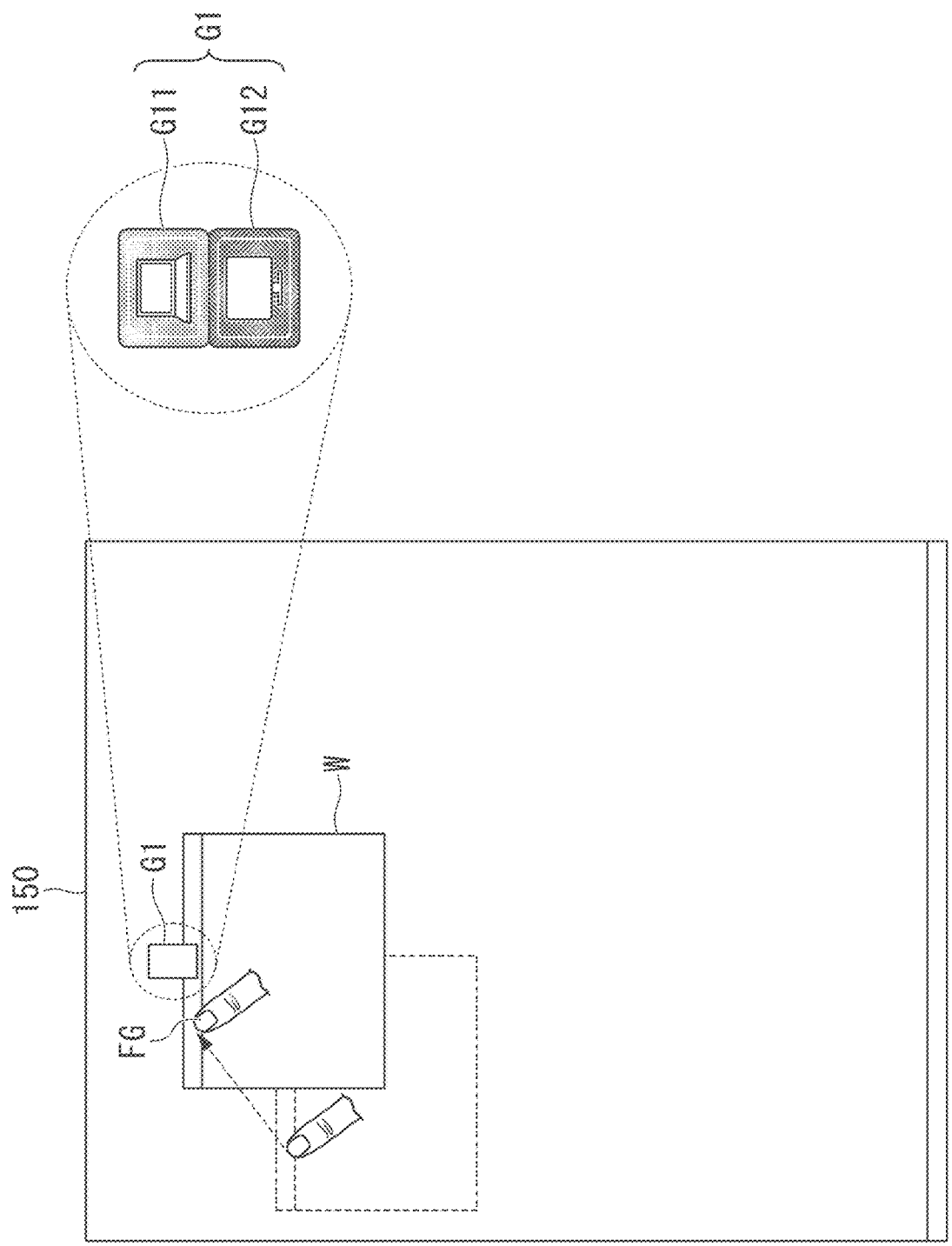
FIG. 7 is a view illustrating a display example of a display selection icon according to the first embodiment.

FIG. 7 is a view illustrating a display example of display selection icons according to the present embodiment. When the user starts a drag operation with the finger FG on the window W displayed on the embedded display (display 150) or the external display (display 250), the display selection icons G1 are displayed at a position based on the start position of the drag operation (for example, near the start position). This figure illustrates an example when a drag operation is started on the window W displayed on the embedded display (display 150). The display position of this display selection icons G1 remains unchanged even if the finger FG is moved by a drag operation.

The display selection icons G1 include an embedded display icon G11 corresponding to the screen area of the embedded display, and an external display icon G12 corresponding to the screen area of the external display. The embedded display icon G11 and the external display icon G12 are displayed with different designs (figures, pictures) imitating the types of the respective displays. That is, the embedded display icon G11 has a design imitating the embedded display provided in the information processing apparatus 10 (for example, a notebook PC). On the other hand, the external display icon G12 has a design imitating the shape of the external display device 20. As a result, when selecting a display for displaying (screen area) by using the display selection icons G1, it is intuitive to know which icon is the selection for the embedded display and which icon is the selection for the external display, and the operability is good.

Figure 8:
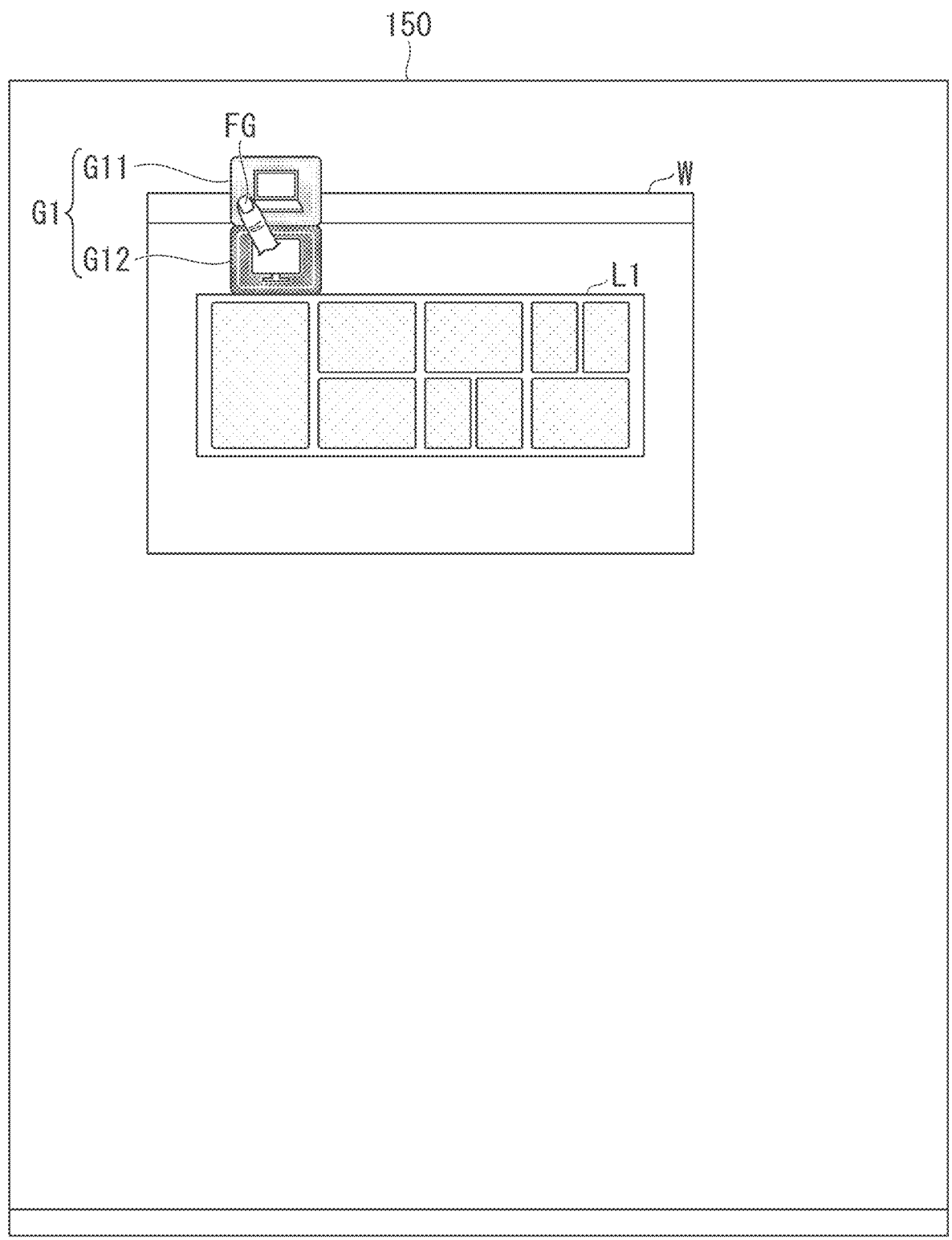
FIG. 8 is a view illustrating a display example when the embedded display is selected by using the display selection icons according to the first embodiment.

FIG. 8 is a view illustrating a display example when the embedded display is selected by using the display selection icons according to the present embodiment. The display selection icons G1 are icons that accept an operation based on the operation position of the drag operation while the drag operation is continued. As illustrated in the figure, when the dragging finger FG (that is, operation position) is hovered over the embedded display icon G11, the embedded display is selected. When the dragging finger FG (that is, operation position) is hovered over the external display icon G12, the external display is selected.

Figure 9:
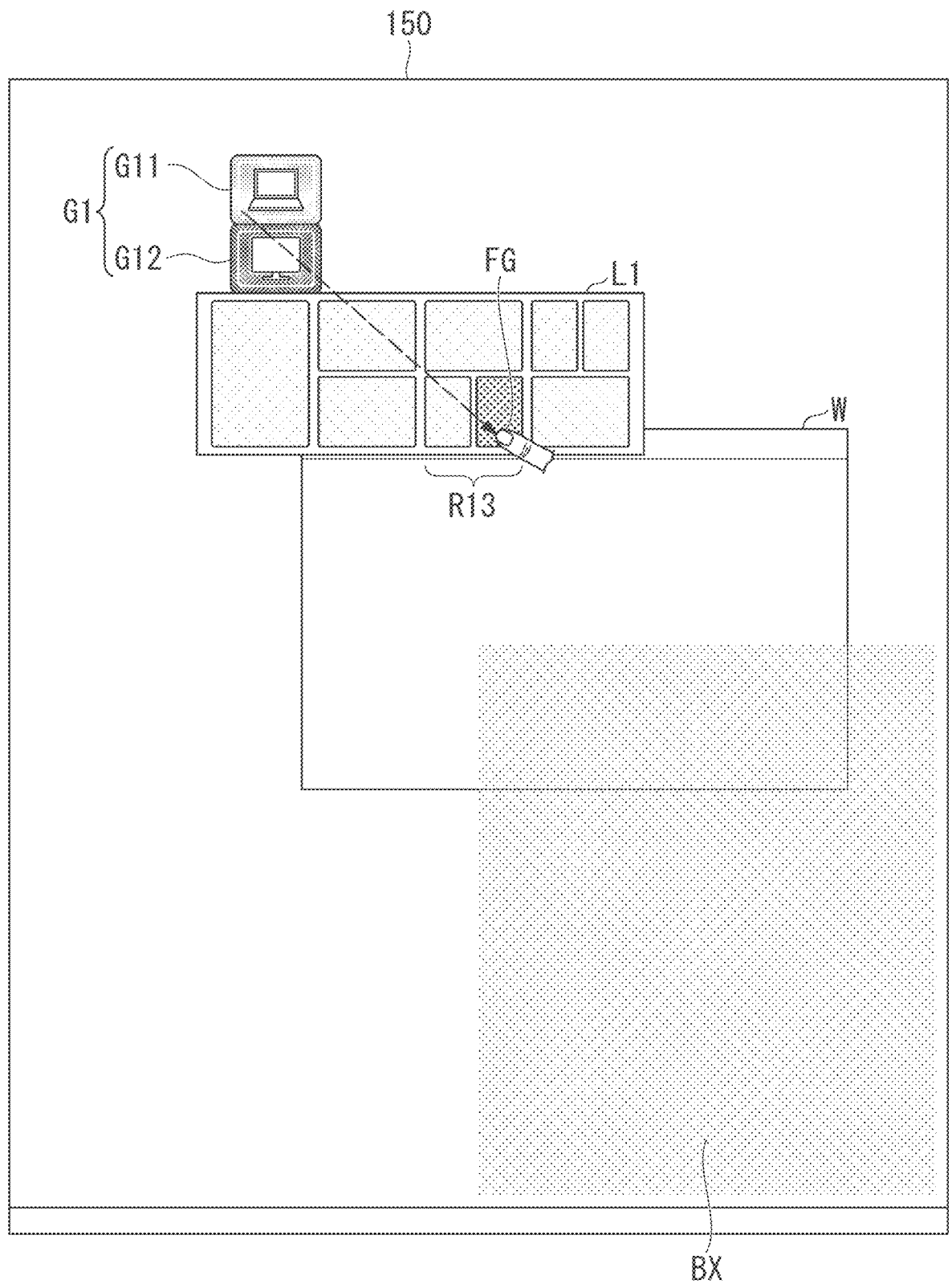
FIG. 9 is a view illustrating a display example when a layout (display area) is selected by using the layout selection icons according to the first embodiment.

FIG. 9 is a view illustrating a display example when a layout (display area) is selected by using the layout selection icons according to the present embodiment. As illustrated in the figure, when the finger FG that has been moved and hovered over the embedded display icon G11 by dragging the window W is hovered over any one of the display areas included in the layout selection icon L1 by continuing the drag operation, the display area hovered by the finger FG can be selected.

In the example illustrated in the figure, by hovering the dragging finger FG over the lower right display area of the three display areas indicated by the reference numeral R13 of the layout selection icon L1, the lower right display area is selected. As a result, display information indicating that the display area has been selected is displayed in the lower right display area (area corresponding to the selected display area) within the screen area of the embedded display (display 150). For example, translucent display information (translucent box BX) indicating an area corresponding to the selected display area is displayed. As a result, it is easy and intuitive to recognize the selected display area (the area for displaying the window W being dragged).

Here, when the drag operation is completed by lifting the finger FG off the screen with the dragging finger FG hovered over any one of the display areas included in the layout selection icon L1 or L2, the display selection and layout (display area) selection are confirmed, and the display position of the window W being dragged is changed to the display area within the screen area of the selected display.

For example, as illustrated in FIG. 9, when the embedded display is selected and the drag operation is completed by lifting the finger FG off the screen with the dragging finger FG hovered over the lower right display area of the three display areas indicated by the reference numeral R13 of the layout selection icon L1, in FIG. 9, the window W being dragged is arranged (snapped) in the display area in which the translucent box BX within the embedded display (display 150) is displayed.

The displayed display selection icon and the layout selection icon end the display in response to the finger FG being lifted off the screen. When the drag operation is completed by lifting the finger FG off the screen while the finger FG is hovered over the area of any layout of the layout selection icons, the window W is snapped and the display of the display selection icon and the layout selection icon is also ended. On the other hand, when the drag operation is completed with the finger FG lifted off the screen while only the display selection icon is displayed, or while the finger FG is not hovered over any layout of the layout selection icons, if the window W is simply arranged at the position at which the drag operation is completed, the display of the display selection icon and the layout selection icon is ended and the snap function is canceled.

As described above, in the present embodiment, when arranging a window in a desired display area by using the snap function, the user performs an operation on the display selection icon and the layout selection icon while dragging the window to be snapped. The advantage is that a desired display area can be selected while dragging a window, which is easy to intuitively recognize, and there are no complicated operations.

However, the embedded display (display 150) of the information processing apparatus 10 is a bendable flexible display. In a flat form, it is easy to perform an operation on the display selection icon and the layout selection icon while dragging the window, but it may be difficult to perform an operation in a bent form. For example, when the display selection icon or the layout selection icon is displayed near the place where the screen is bent, as the user moves the user's finger along the screen while dragging a window, the finger may unintentionally lift off the screen because the screen is curved.

Figure 10:
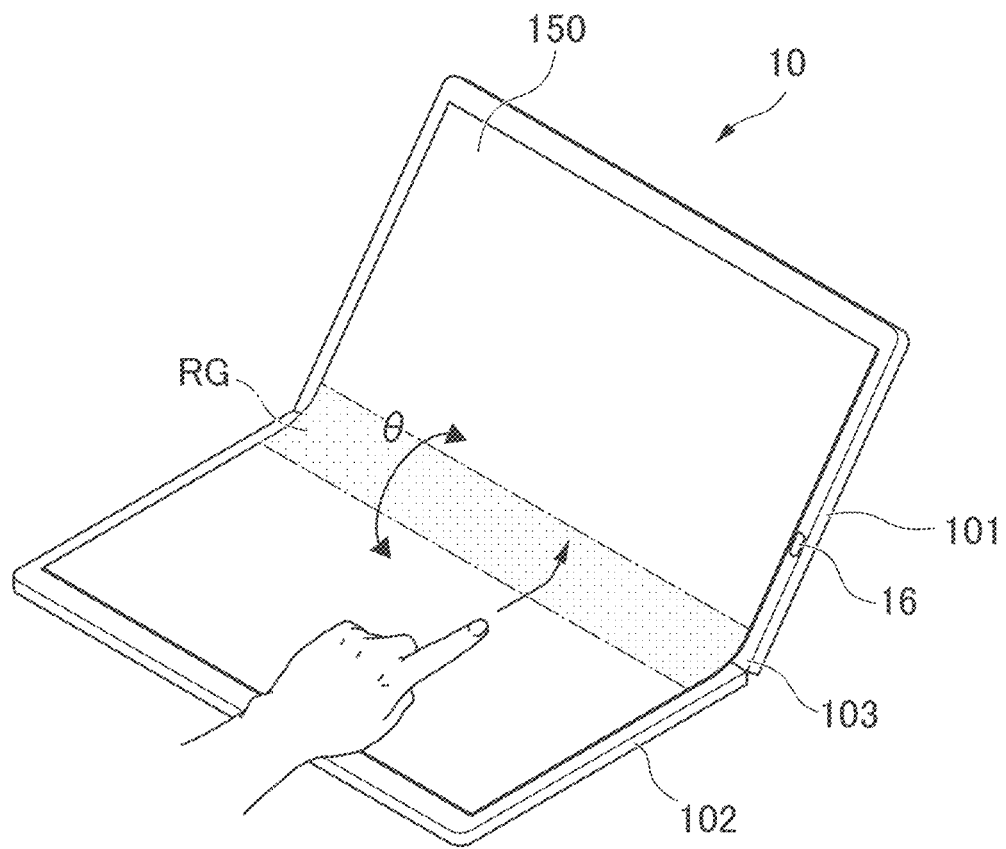
FIG. 10 is a view illustrating an example of an operation at a place where a screen according to the first embodiment is bent.

FIG. 10 is a view illustrating an example of an operation at a place where the screen according to the present embodiment is bent. As illustrated in the figure, for example, in a range RG indicated by hatching near the crease of the screen of the embedded display (display 150), as the user moves the finger along the screen, the finger is likely to lift off the screen unintentionally. If the display of the display selection icon or the layout selection icon is ended by the finger lifting off the screen, the snap function will be canceled and the operation will have to be redone.

Therefore, even if the user's finger lifts off the screen as the user moves the finger along the screen, the information processing apparatus 10 according to the present embodiment does not immediately end the display when the display selection icon or the layout selection icon is displayed, but continues the display for a certain period of time. As a result, even if the user's finger temporarily lifts off the screen, the information processing apparatus 10 can continue to operate on the display selection icon or the layout selection icon by resuming the drag operation while the display selection icon or the layout selection icon is still displayed.

[Configuration of Information Processing Apparatus]

Figure 11:
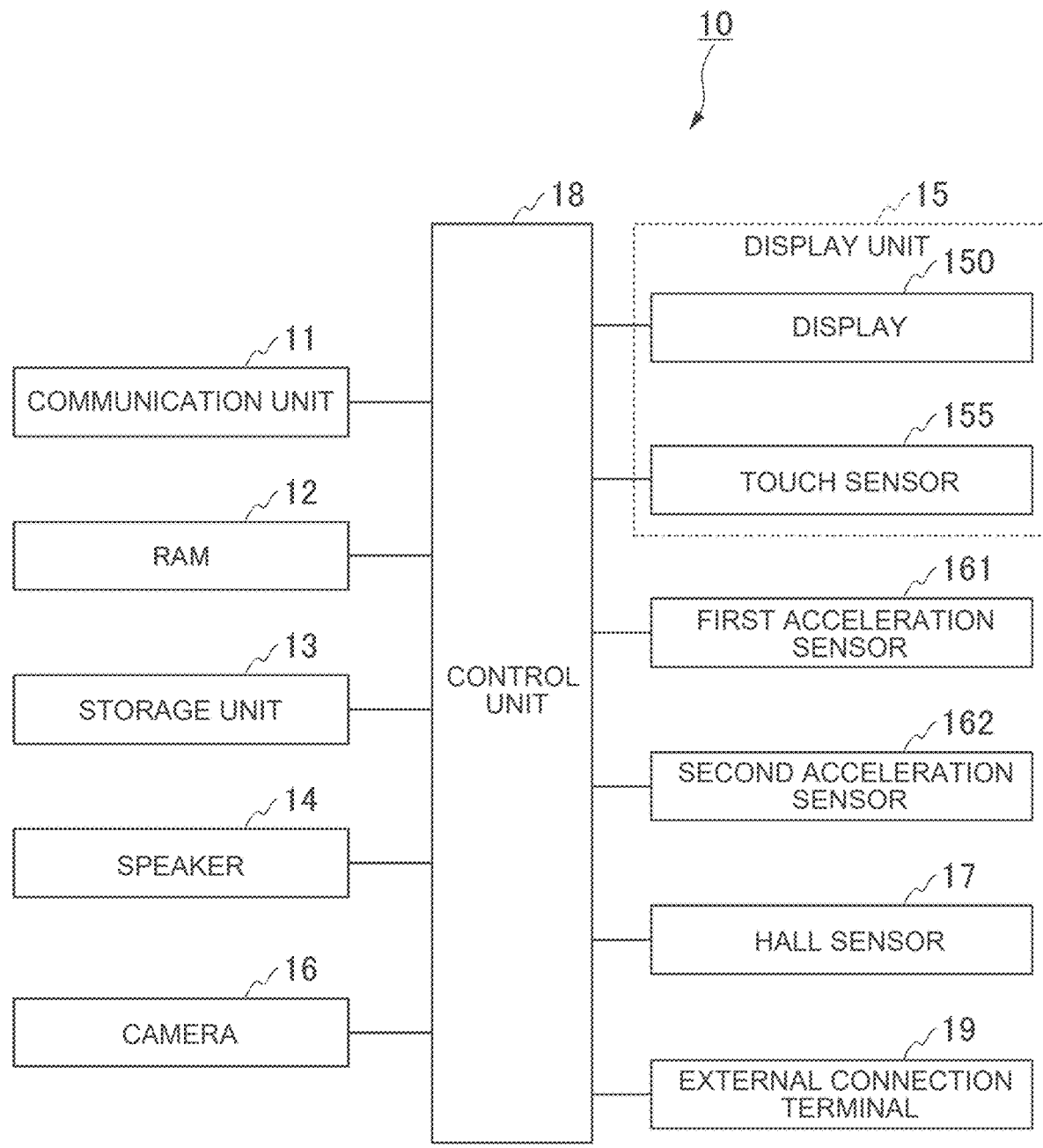
FIG. 11 is a block view illustrating an example of a hardware configuration of the information processing apparatus according to the first embodiment.

Hereinafter, a specific configuration of the information processing apparatus 10 will be described. FIG. 11 is a block view illustrating an example of a hardware configuration of the information processing apparatus 10 according to the present embodiment. The information processing apparatus 10 includes a communication unit 11, a random access memory (RAM) 12, a storage unit 13, a speaker 14, a display unit 15, a camera 16, a first acceleration sensor 161, and a second acceleration sensor 162, a hall sensor 17, a control unit 18, and an external connection terminal 19. These units are communicably connected to each other via a bus or the like.

The communication unit 11 includes, for example, digital input/output ports such as a plurality of Ethernet (registered trademark) ports or a plurality of universal serial buses (USB), and a communication device that performs wireless communication such as Bluetooth (registered trademark) or Wi-Fi (registered trademark). For example, the communication unit 11 can communicate with the external keyboard 30 or the like described above by using Bluetooth (registered trademark).

A program or data for the process executed by the control unit 18 is loaded in the RAM 12, and various types of data are saved or deleted as appropriate. For example, the RAM 12 also functions as a display video memory (V-RAM) for display of the display 150. As an example, the RAM 12 functions as a video memory for data displayed in each display area within the screen area of the display 150 (or the display 250 when the external display device 20 is connected). In addition, the RAM 12 stores information about running apps, which apps are being used among running apps (apps in active windows), information about other apps in inactive windows, information such as in which display area each window is displayed, in which layer each window is arranged, the size of the window, and whether or not the window is minimized. Since the RAM 12 is a volatile memory, the data is not held when the supply of power to the RAM 12 is stopped. The data that needs to be held when the supply of power to the RAM 12 is stopped is transferred to the storage unit 13.

The storage unit 13 includes any one or more of a solid state drive (SSD), a hard disk drive (HDD), a read only memory (ROM), a Flash-ROM, and the like. For example, the storage unit 13 saves a program or setting data of a basic input output system (BIOS), a program of an operating system (OS) or an app operating on the OS, various types of data used in the app, and the like.

The speaker 14 outputs an electronic sound, a voice, or the like.

The display unit 15 is provided with the display 150 and a touch sensor 155. As described above, the display 150 is a flexible display that can be bent according to the opening angle θ due to the relative rotation of the first chassis 101 and the second chassis 102. The display 150 performs display corresponding to each display mode described with reference to FIG. 4 according to the control of the control unit 18. The touch sensor 155 is provided on the screen of the display 150, and detects the touch operation on the screen. For example, the touch sensor 155 detects the touch operation on the display area DA in the one-screen mode. In addition, the touch sensor 155 detects the touch operation on one or both of the first display area DA1 and the second display area DA2 in the two-screen mode. A tap operation, a slide operation, a flick operation, a swipe operation, a pinch operation, and the like are included in the touch operation. The touch sensor 155 detects the touch operation to output operation information based on the detected operation to the control unit 18.

The camera 16 includes a lens, an imaging element, and the like. The camera 16 captures an image (a still image or a moving image) according to the control of the control unit 18 to output data of the captured image.

The first acceleration sensor 161 is provided inside the first chassis 101, and detects the orientation of the first chassis 101 and the change in the orientation. For example, assuming that a direction parallel to a longitudinal direction of the first display area DA1 is an X1 direction, a direction parallel to a lateral direction is a Y1 direction, and a direction perpendicular to the X1 direction and the Y1 direction is a Z1 direction, the first acceleration sensor 161 detects acceleration in each of the X1 direction, the Y1 direction, and the Z1 direction to output the detection result to the control unit 18.

The second acceleration sensor 162 is provided inside the second chassis 102, and detects the orientation of the second chassis 102 and the change in the orientation. For example, assuming that a direction parallel to a longitudinal direction of the second display area DA2 is an X2 direction, a direction parallel to a lateral direction is a Y2 direction, and a direction perpendicular to the X2 direction and the Y2 direction is a Z2 direction, the second acceleration sensor 162 detects acceleration in each of the X2 direction, the Y2 direction, and the Z2 direction to output the detection result to the control unit 18.

The hall sensor 17 is provided to detect the connection with the keyboard 30. For example, when the keyboard 30 is placed on the second display area DA2 of the second chassis 102, a magnetic field is changed due to approaching of the magnet provided in the inner portion of the bottom surface of the keyboard 30, and the detection value (output value) of the hall sensor 17 is changed. In other words, the hall sensor 17 outputs different detection results according to whether or not the keyboard 30 is placed. Here, the hall sensor 17 is used to detect whether or not the keyboard 30 is placed, but the detection method is not limited thereto, and any detection method can be used.

The external connection terminal 19 is a connection terminal for connecting to the external display device 20 (external display). For example, the external connection terminal 19 is an HDMI (registered trademark) terminal, a USB Type-C terminal, a display port, or the like. The information processing apparatus 10 and the external display device 20 may be connected wirelessly.

The control unit 18 includes a processor such as a central processing unit (CPU), a graphic processing unit (GPU), or a microcomputer, and realizes various functions by the processor executing the programs (various programs such as the BIOS, the OS, and the app operating on the OS) stored in the storage unit 13 or the like. For example, the control unit 18 detects the posture (orientation) of the information processing apparatus 10 based on the detection results of the first acceleration sensor 161 and the second acceleration sensor 162. In addition, the control unit 18 detects, based on the detection results of the first acceleration sensor 161 and the second acceleration sensor 162, whether the information processing apparatus 10 is in the open state or closed state, and whether the information processing apparatus 10 is in the bent form or the flat form in the open state, or the like.

In addition, the control unit 18 detects the connection with the keyboard 30 based on the detection result of the hall sensor 17. The connection with the keyboard 30 refers to the placement of the keyboard 30 on the second display area DA2, and does not refer to communication connection. The control unit 18 detects the communication connection with the keyboard 30 by using a function of Bluetooth (registered trademark) or the like.

In addition, the control unit 18 controls the display of the display 150 described with reference to FIG. 4 by detecting the state of the system, the posture (orientation) of the information processing apparatus 10, whether the information processing apparatus 10 is in the open or closed state, whether the information processing apparatus 10 is in the bent form or flat form in the open state, whether the information processing apparatus 10 is connected to the keyboard 30, and the like.

Further, by dragging a window displayed on the display 150 (embedded display) or the display 250 (external display), the control unit 18 controls of displaying a display selection icon or a layout selection icon for selecting the display destination and screen layout of the window (see FIGS. 5 to 9).

Next, among the processes executed by the control unit 18, a display layout change process of controlling the display of the display selection icon and the layout selection icon to change the destination for displaying a window and the layout in response to an operation on the icon, will be described in detail. In the following description, as illustrated in FIG. 6, the information processing apparatus 10 will be described as being connected to the external display device 20 and controlling display of the embedded display and the external display.

Figure 12:
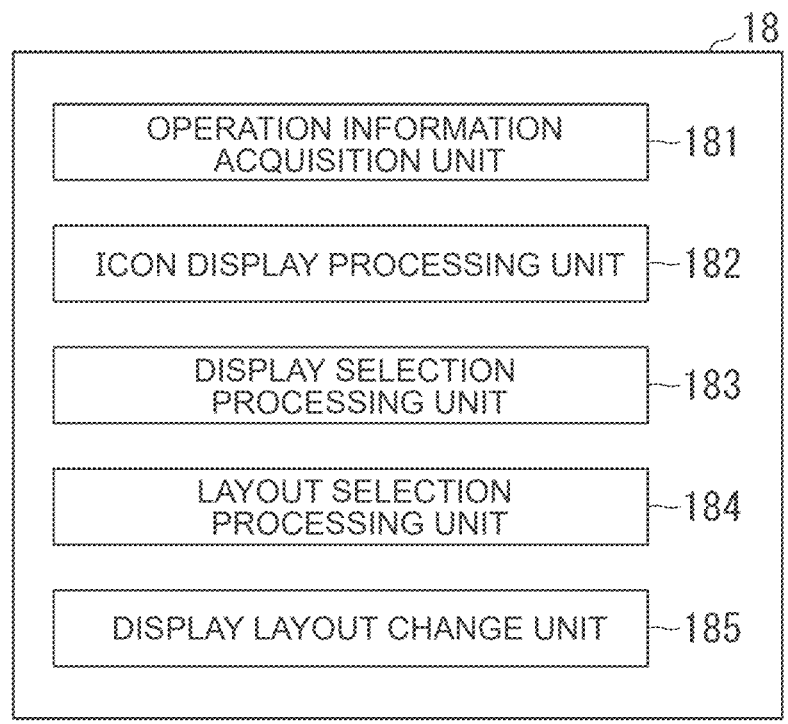
FIG. 12 is a block view illustrating an example of a functional configuration of the information processing apparatus according to the first embodiment.

FIG. 12 is a block view illustrating an example of a functional configuration related to the display layout change process of the information processing apparatus 10 according to the present embodiment. As a functional configuration in which the CPU executes processing based on the OS or programs operating on the OS, and the like, the control unit 18 includes an operation information acquisition unit 181, an icon display processing unit 182, a display selection processing unit 183, a layout selection processing unit 184, and a display layout change unit 185.

The icon display processing unit 182 performs an icon display process of displaying the display selection icon and the layout selection icon on the screen area of the display. For example, when a drag operation is accepted for a window displayed on at least one of the screen area of the embedded display and the screen area of the external display, the icon display processing unit 182 displays the display selection icons G1 at a position based on the start position of the drag operation (for example, near the start position) in the screen area in which the drag operation is started (see FIG. 7). The display selection icons G1 include an embedded display icon G11 corresponding to the screen area of the embedded display, and an external display icon G12 corresponding to the screen area of the external display.

In addition, the icon display processing unit 182 newly displays a layout selection icon from which a display area can be selected for displaying a window within the screen area selected by the operation on the display selection icon (see FIG. 8). For example, the icon display processing unit 182 displays the layout selection icon L1 illustrated in FIG. 5(A) when the usage form is "Portrait (or Clamshell)", and displays the layout selection icon L2 illustrated in FIG. 5(B) when the usage form is "Landscape".

In addition, when a drag operation is completed on a window (for example, when the dragging finger lifts off the screen) in a state in which the display selection icons or the layout selection icons are displayed, the icon display processing unit 182 performs an icon display end process of ending (hiding) the display of these icons.

In addition, even if a drag operation is completed on a window (for example, even if the dragging finger lifts off the screen) in a state in which the display selection icons or the layout selection icons are displayed, the icon display processing unit 182 performs the Icon display continuation process of continuing the display of these icons when the drag operation is temporarily interrupted.

For example, the icon display processing unit 182 performs a determination process of determining whether or not the display 150 is in a bent form by determining whether the display 150 is in a bent form or flat form. For example, the icon display processing unit 182 determines that the display is in a bent form when the opening angle θ is less than 170° (θ<170°), and determines that the display is not bent, that is, in a flat form when the opening angle θ is between 170° and 180° (170°≤θ≤180°). When it is determined that the display 150 is in a flat form (not bent form) by the determination process, the icon display processing unit 182 does not execute the icon display continuation process, but ends the display of the display selection icon and the layout selection icon in response to the completion of the drag operation on the window (for example, when the dragging finger lifts off the screen), regardless of whether or not the drag operation is temporarily interrupted on the window by the icon display end process.

In addition, the icon display processing unit 182 executes the icon display continuation process when it is determined that the display 150 is in a bent form by the determination process. For example, the icon display processing unit 182 continues the display of the displayed icon among the display selection icons and the layout selection icons until a predetermined time (for example, 0.5 seconds) elapses after the drag operation is completed, even if the drag operation is completed on the window (for example, even if the dragging finger lifts off the screen). In addition, when the drag operation is not resumed before the predetermined time elapses (for example, when the finger that has lifted off the screen contacts the screen again to resume the drag operation), the icon display processing unit 182 ends the display of the icon that has been continued to be displayed.

In addition, while the display of the display selection icons or the layout selection icons is being continued by the icon display continuation process, if an operation (drag operation, touch operation, and the like) is performed on a window different from the window that is being dragged when those icons are displayed, the icon display processing unit 182 ends the display of the icon that has been continued to be displayed.

The display selection processing unit 183 selects the screen area corresponding to the icon selected by a drag operation between the embedded display icon G11 and the external display icon G12 as a screen area for displaying a window being dragged.

The layout selection processing unit 184 selects the display area selected by the drag operation on the layout selection icon as a display area for displaying a window being dragged.

In response to the completion of the drag operation on the window, the display layout change unit 185 changes the display position of a window to the display area selected by the layout selection processing unit 184 within the screen area of the display selected by the display selection processing unit 183.

[Operation of Display Layout Change Process]

Figure 13:
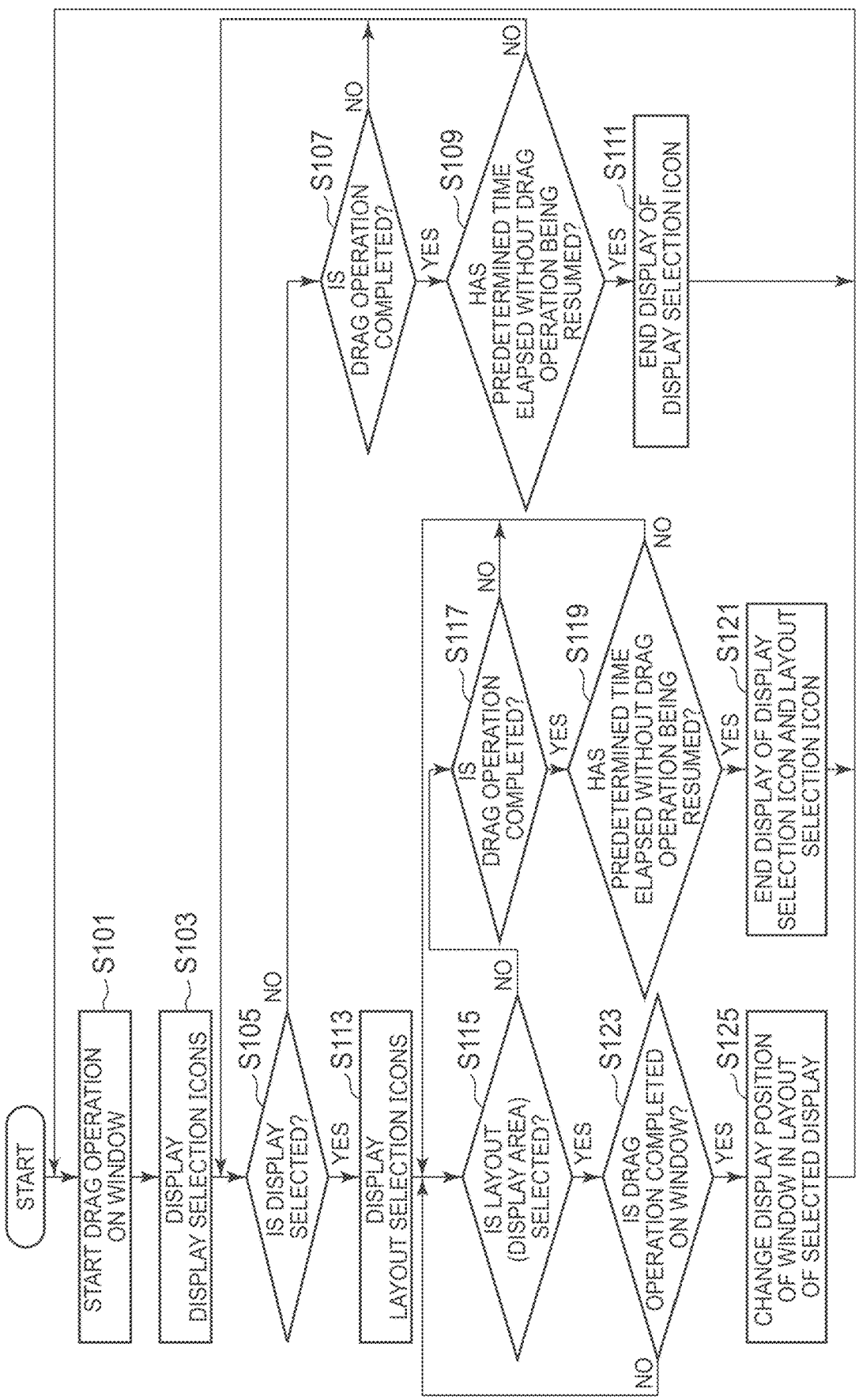
FIG. 13 is a flowchart illustrating an example of a display layout change process according to the first embodiment.

Next, the operation of the display layout change process executed by the control unit 18 will be described. FIG. 13 is a flowchart illustrating an example of the display layout change process according to the present embodiment.

(Step S101) When the control unit 18 accepts that a drag operation has been started on the window displayed on the screen area of the embedded display or the external display, the process advances to step S103.

(Step S103) The control unit 18 displays the display selection icons G1 on the screen area of the display on which the drag operation is started, between the embedded display and the external display (see FIG. 7). For example, the control unit 18 displays the embedded display icon G11 and the external display icon G12 included in the display selection icons G1 with different designs (figures, pictures) imitating the types of the respective displays (see FIG. 7). Then, the process advances to step S105.

(Step S105) The control unit 18 determines whether or not a display has been selected by a drag operation on the display selection icons G1. For example, when the finger FG (operation position) that the user is dragging is hovered over any one of the embedded display icon G11 and external display icon G12 in the display selection icons G1, the control unit 18 determines that a display has been selected. On the other hand, when the finger FG (operation position) that the user is dragging is not hovered over either the embedded display icon G11 or the external display icon G12, the control unit 18 determines that no display has been selected.

When the control unit 18 determines that a display has not been selected (NO), the process advances to step S107. On the other hand, when the control unit 18 determines that a display has been selected (YES), the control unit 18 selects the display corresponding to the icon on which the finger FG (operation position) is hovered over among the embedded display icon G11 and the external display icon G12 as a display for displaying the window on which the drag operation is performed (see FIG. 8), the process advances to step S115.

(Step S107) The control unit 18 determines whether or not the drag operation is completed on the window. When the control unit 18 determines that the drag operation is not completed on the window (NO), the process returns to step S105. On the other hand, when the control unit 18 determines that the drag operation is completed on the window (YES), the process advances to step S109.

(Step S109) The control unit 18 determines whether a predetermined time (for example, 0.5 seconds) has elapsed without the drag operation being resumed. When the control unit 18 determines that the drag operation is resumed before the predetermined time (for example, 0.5 seconds) has elapsed (NO), the process returns to step S105. On the other hand, when the control unit 18 determines that a predetermined time (for example, 0.5 seconds) has elapsed without the drag operation being resumed (YES), the process advances to step S111.

(Step S111) The control unit 18 ends (hides) the display of the display selection icons G1 displayed in step S103. Then, the process returns to step S101.

That is, in the process of step S109, the control unit 18 does not immediately end the display of the display selection icon after the drag operation is completed, but performs the icon display continuation process of continuing the display of the display selection icon until a predetermined time (for example, 0.5 seconds) elapses.

(Step S113) The control unit 18 newly displays a layout selection icon from which a display area can be selected, in which a window is to be displayed within the screen area of the display selected in step S105 (see FIG. 8). For example, the control unit 18 displays the layout selection icon L1 illustrated in FIG. 5(A) when the usage form is "Portrait (or Clamshell)", and displays the layout selection icon L2 illustrated in FIG. 5(B) when the usage form is "Landscape". Then, the process advances to step S115.

(Step S115) The control unit 18 determines whether or not a layout (display area) is selected by the drag operation on the layout selection icon L1 or L2. For example, when the finger FG (operation position) that the user is dragging is hovered over any one of the display areas included in the layout selection icon L1 or L2, the control unit 18 determines that a layout (display area) has been selected. On the other hand, when the finger FG (operation position) that the user is dragging is not hovered over any of the display areas included in the layout selection icon L1 or L2, the control unit 18 determines that no layout (display area) has been selected.

When the control unit 18 determines that no layout (display area) is selected (NO), the process advances to step S117. On the other hand, when the control unit 18 determines that a layout (display area) is selected (YES), the control unit 18 selects the display area selected by the drag operation on the layout selection icon as a display area for displaying the window being dragged, and the process advances to step S123.

(Step S117) The control unit 18 determines whether or not the drag operation is completed on the window. When the control unit 18 determines that the drag operation is not completed on the window (NO), the process returns to step S115. On the other hand, when the control unit 18 determines that the drag operation is completed on the window (YES), the process advances to step S119.

(Step S119) The control unit 18 determines whether a predetermined time (for example, 0.5 seconds) has elapsed without the drag operation being resumed. When the control unit 18 determines that the drag operation is resumed before the predetermined time (for example, 0.5 seconds) has elapsed (NO), the process returns to step S115. On the other hand, when the control unit 18 determines that a predetermined time (for example, 0.5 seconds) has elapsed without the drag operation being resumed (YES), the process advances to step S121.

(Step S121) The control unit 18 ends (hides) the display of the display selection icons G1 displayed in step S103 and the display of the layout selection icon L1 or L2 displayed in step S113. Then, the process returns to step S101.

That is, in the process of step S119, the control unit 18 does not immediately end the display of the display selection icon and the layout selection icon after the drag operation is completed, but performs the icon display continuation process of continuing the display of the display selection icon and the layout selection icon until a predetermined time (for example, 0.5 seconds) elapses.

(Step S123) The control unit 18 determines whether or not the drag operation is completed in a state in which a layout (display area) is selected by the drag operation on the layout selection icon. When the control unit 18 determines that the drag operation is not ended (NO), the process returns to step S115. On the other hand, when the control unit 18 determines that the drag operation is completed (YES), the process advances to step S125.

(Step S125) The control unit 18 changes the display position of the window in which the drag operation is completed to the layout (display area) in the screen area of the selected display, and ends the display layout change process. When changing the display position of the window, the control unit 18 ends (hides) the display of the display selection icons G1 and the layout selection icon L1 or L2 that are being displayed.

Here, the control unit 18 does not execute the icon display continuation process of step S109 and step S119 when the display is in a flat form, but executes the icon display continuation process when the display is in a bent form in which the finger may lift off the screen unintentionally. That is, the control unit 18 switches between whether or not to execute the icon display continuation process depending on whether the display is in a flat form or a bent form.

Figure 14:
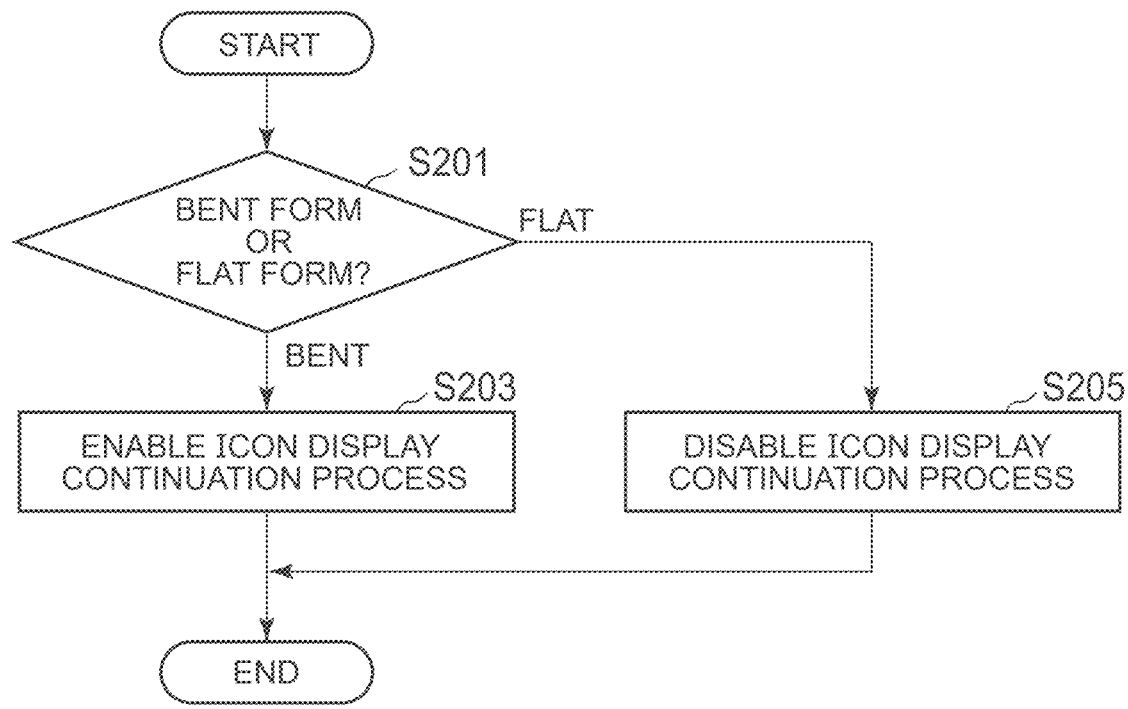
FIG. 14 is a flowchart illustrating an example of the process of switching between enabling and disabling an icon display continuation process according to the first embodiment.

FIG. 14 is a flowchart illustrating an example of the process of switching between enabling and disabling the icon display continuation process according to the present embodiment. The control unit 18 determines whether the display is in a bent form or flat form based on the detection result of the first acceleration sensor 161 and the second acceleration sensor 162 (step S201). When it is determined that the display is in a bent form, the control unit 18 sets the icon display continuation process to be enabled (step S203). On the other hand, when it is determined that the display is in a flat form, the control unit 18 sets the icon display continuation process to be disabled (step S205).

When the icon display continuation process is set to be enabled, the processes of steps S109 and S119 of FIG. 13 are executed, but when the icon display continuation process is set to be disabled, the processes of steps S109 and S119 of FIG. 13 are not executed and are skipped.

The control unit 18 may set the icon display continuation process to be enabled and execute the icon display continuation process regardless of whether the display is in a bent form or flat form. For example, since the finger may unintentionally lift off the screen during a drag operation even in a flat form, the display of the display selection icon and the layout selection icon can be continued by executing the icon display continuation process in such cases.

As described above, the information processing apparatus 10 according to the present embodiment includes the bendable display 150, the touch sensor 155 for detecting a touch operation on the screen area of the display 150, a storage unit 13 (an example of a memory) for storing a program of an application, and the control unit 18 (for example, a CPU, a GPU, a microcomputer, or the like, which is a processor) that performs control of arranging and displaying the window of the running application in the screen area of the display 150 by executing the program of the application stored in the storage unit 13. The control unit 18 performs an operation information acquisition process of acquiring operation information based on the detection result by the touch sensor 155. In addition, in response to a drag operation being started on a window displayed in the screen area of the display 150, the control unit 18 performs an icon display process of displaying an icon for accepting an operation based on the operation position of the drag operation while continuing the drag operation, in the screen area of the display 150. In addition, when the drag operation is completed on the window, the control unit 18 performs the icon display end process of ending the display of the icon, and further performs the icon display continuation process of continuing the display of the icon when the drag operation is completed on the window but is only temporarily interrupted.

As a result, even if the dragging finger unintentionally lifts off the screen momentarily, the information processing apparatus 10 continues the display of the icon for accepting an operation by the drag operation, and thus the user can continue to operate without having to redo the operation. Therefore, the information processing apparatus 10 can improve operability for the screen of a bendable display (flexible display).

For example, the control unit 18 performs the determination process of determining whether or not the display 150 is in a bent form. When it is determined by the determination process that the display 150 is not in a bent form (that is, flat form), the control unit 18 does not execute the icon display continuation process, but ends the display of the icon in response to the completion of the drag operation on a window, regardless of whether the drag operation is temporarily interrupted by the icon display end process. In addition, when it is determined by the determination process that the display 150 is in a bent form, by executing the icon display continuation process, the control unit 18 continues the display of the icon until a predetermined time (for example, 0.5 seconds) elapses after the drag operation is completed on the window even if the drag operation is completed on the window, and ends the display of the icon when the drag operation is not resumed after a predetermined time (for example, 0.5 seconds) elapses.

As a result, even if the dragging finger unintentionally lifts off the screen momentarily at a place where the screen is bent, the information processing apparatus 10 continues the display of the icon for accepting an operation by the drag operation, and thus the user can continue to operate without having to redo the operation. Therefore, the information processing apparatus 10 can improve operability for the screen of a bendable display (flexible display).

The control unit 18 may change the predetermined time to continue the display of the icon based on the bending angle of the display 150 in a bent form. For example, the control unit 18 may lengthen or shorten the predetermined time to continue the display of the icon based on the bending angle. As an example, the control unit 18 may lengthen the predetermined time to continue the display of the icon because the smaller the opening angle θ, the easier it is for the finger to unintentionally lift off the screen.

Accordingly, since the information processing apparatus 10 changes the time that the display of the icon is continued when the finger lifts off the screen according to the angle at which the screen is bent, it is possible to improve operability for the screen of a bendable display (flexible display).

In addition, while the display of the icon is continued by the icon display continuation process, if an operation is performed on a window different from the window on which the drag operation is performed when the icon is displayed, the control unit 18 ends the display of the icon of which the display is continued.

As a result, the information processing apparatus 10 can end the display of the icon when the user intentionally completes the drag operation.

In addition, the control unit 18 performs control arranging and displaying windows in the screen areas of a plurality of displays, which include an embedded display provided in the information processing apparatus as the display 150 and an external display (for example, display 250) connected to the information processing apparatus 10. In the icon display process, the control unit 18 displays a display selection icon (an example of a first icon) for accepting an operation of selecting a display to display a window from among the plurality of displays, as the above icon.

As a result, even if the dragging finger unintentionally lifts off the screen momentarily, the information processing apparatus 10 continues the display of the display selection icon for accepting an operation by the drag operation, and thus the user can continue the operation of selecting a display without having to redo the operation. Therefore, the information processing apparatus 10 can improve operability for the screen of a bendable display (flexible display).

In addition, in the icon display process, the control unit 18 displays a layout selection icon (an example of a second icon) as the above icon, from which a display area can be selected for displaying a window within the screen area of the display selected based on the operation on the display selection icon.

As a result, even if the dragging finger unintentionally lifts off the screen momentarily, the information processing apparatus 10 continues the display of the layout selection icon for accepting an operation by the drag operation, and thus the user can continue the operation of selecting a layout (display area) without having to redo the operation. Therefore, the information processing apparatus 10 can improve operability for the screen of a bendable display (flexible display).

In addition, the control method in the information processing apparatus 10 according to the present embodiment includes, via the control unit 18, a step of acquiring operation information based on the detection result by the touch sensor 155, a step of, in response to a drag operation being started on a window displayed in the screen area of the display 150, displaying an icon for accepting an operation based on the operation position of the drag operation while continuing the drag operation, in the screen area of the display 150, a step of ending the display of the icon when the drag operation is completed on the window, and a step of continuing the display of the icon when the drag operation is completed on the window but is only temporarily interrupted.

As a result, even if the dragging finger unintentionally lifts off the screen momentarily, the control method in the information processing apparatus 10 continues the display of the icon for accepting an operation by the drag operation, and thus the user can continue to operate without having to redo the operation. Therefore, the control method in the information processing apparatus 10 can improve operability for the screen of a bendable display (flexible display).

Second Embodiment

Next, a second embodiment of the present invention will be described. In the first embodiment, the control of switching between whether or not to execute the icon display continuation process depending on whether a display is in a flat form or bent form, but switching may be performed between whether or not to execute the icon display continuation process based on the operation position of a drag operation.

For example, the finger may unintentionally lift off the screen at a position at which the display 150 is bendable. Therefore, the control unit 18 may execute the icon display continuation process when the current operation position of the drag operation is a position at which the display 150 is bendable (for example, the range RG near the crease illustrated in FIG. 10).

Figure 15:
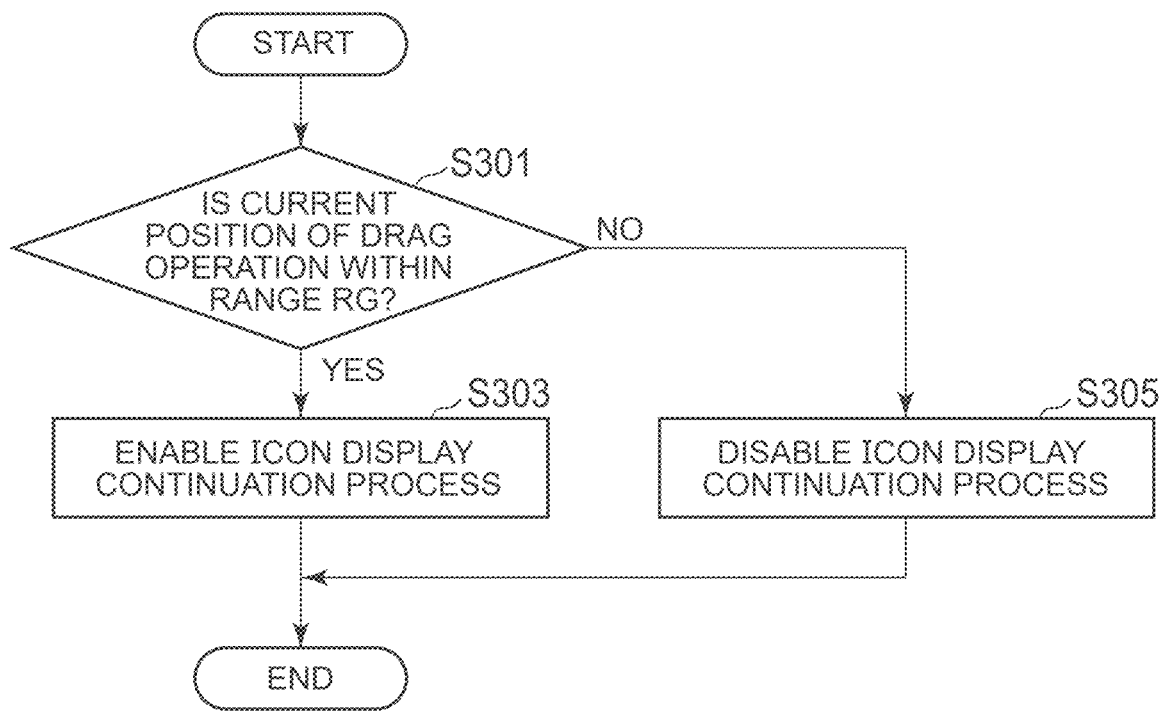
FIG. 15 is a flowchart illustrating an example of the process of switching between enabling and disabling an icon display continuation process according to a second embodiment.

FIG. 15 is a flowchart illustrating an example of the process of switching between enabling and disabling the icon display continuation process according to the present embodiment. The control unit 18 detects the current operation position of the drag operation based on the detection result of the touch sensor 155 and determines whether or not the current operation position is within the range RG near the crease (step S301). When it is determined that the current operation position is within the range RG (YES), the control unit 18 sets the icon display continuation process to be enabled (step 303). On the other hand, when it is determined that the current operation position is not within the range RG (NO), the control unit 18 sets the icon display continuation process to be disabled (step S305).

As described above, the control unit 18 controls whether or not to execute the icon display continuation process based on the position at which the display 150 is bendable and the current position of the drag operation.

As a result, even if the dragging finger unintentionally lifts off the screen momentarily at a place where the screen is bent, the information processing apparatus 10 can continue the display of the icon for accepting an operation by the drag operation, and thus the user can continue to operate without having to redo the operation. Therefore, the information processing apparatus 10 can improve operability for the screen of a bendable display (flexible display).

The display positions of the display selection icon and layout selection icon are determined based on a start position of the drag operation. Therefore, the control unit 18 may execute the icon display continuation process when the display selection icon and the layout selection icon are displayed at the position at which the display 150 is bendable (for example, in the range RG near the crease illustrated in FIG. 10). That is, the control unit 18 may control whether or not to execute the icon display continuation process based on the position at which the display 150 is bendable (for example, the range RG near the crease illustrated in FIG. 10) and the start position of the drag operation.

As a result, even if the dragging finger unintentionally lifts off the screen momentarily at a place where the screen is bent, the information processing apparatus 10 can continue the display of the icon for accepting an operation by the drag operation, and thus the user can continue to operate without having to redo the operation. Therefore, the information processing apparatus 10 can improve operability for the screen of a bendable display (flexible display).

In addition, the display positions of the display selection icon and the layout selection icon may be included in the position at which the display 150 is bendable (for example, the range RG near the crease illustrated in FIG. 10), or may include only a part of the icon. Therefore, depending on which part of the icon is operated (that is, operation direction), the necessity of executing the icon display continuation process also varies. Therefore, the control unit 18 may control whether or not to execute the icon display continuation process based on the position at which the display 150 is bendable (for example, the range RG near the crease illustrated in FIG. 10), and the start position and the operation direction of the drag operation.

As a result, even if the dragging finger unintentionally lifts off the screen momentarily at a place where the screen is bent, the information processing apparatus 10 can continue the display of the icon for accepting an operation by the drag operation, and thus the user can continue to operate without having to redo the operation. Therefore, the information processing apparatus 10 can improve operability for the screen of a bendable display (flexible display).

Although the embodiments of the present invention have been described above in detail with reference to the accompanying drawings, a specific configuration is not limited to the above-described configuration, and various design changes and the like can be made without departing from the gist of the present invention. For example, the configurations described in the above-described embodiments may be optionally combined.

In addition, in the embodiment described above, the example where the display 150 provided in the information processing apparatus 10 is a bendable display is described, but an external display (display 250) may also be a bendable display, and the icon display continuation process described above may also be applied to an external display (display 250).

In addition, in the embodiment described above, an example has been illustrated in which the plurality of displays whose display is controlled by the information processing apparatus 10 are two displays: the embedded display of the information processing apparatus 10 and the external display of the external display device 20, but the present invention is not limited thereto. When the information processing apparatus 10 is equipped with a plurality of embedded displays, the plurality of displays whose display is controlled may be the plurality of embedded displays. Further, when the information processing apparatus 10 is connected to a plurality of external display devices 20, the plurality of displays whose display is controlled may be the plurality of external displays, or the plurality of external displays and one or a plurality of embedded displays. That is, the plurality of displays whose display is controlled by the information processing apparatus 10 may be two displays, three or more displays, and may be either an embedded display or an external display.

In addition, in the embodiment described above, there are three types of layouts that can be selected from the layout selection icon L1 or L2 (see FIG. 5): a layout in which the entire screen area of the display 150 is one display area, a layout in which the screen area is split into two, upper and lower, and a layout in which the screen area is split into three, but the present invention is not limited thereto. For example, it may be possible to select only a part of the above three types of layouts, or it may be possible to select a layout in which the screen area is split into four or more display areas.

The information processing apparatus 10 described above has a computer system inside. The process in each configuration of the information processing apparatus 10 described above may be performed by recording a program for realizing the function of each configuration of the information processing apparatus 10 described above on a computer-readable recording medium, and reading the program recorded on the recording medium with the computer system to execute the program. Here, "reading the program recorded on the recording medium into the computer system to execute the program" includes installing the program in the computer system. The "computer system" herein includes the OS or hardware such as peripheral devices. In addition, the "computer system" may include a plurality of computer apparatuses connected via a network including a communication line such as the Internet, a WAN, a LAN, or a dedicated line. In addition, the "computer-readable recording medium" is a portable medium such as a flexible disk, a magneto-optical disk, a ROM, or a CD-ROM, and a storage device such as a hard disk built in the computer system. As described above, the recording medium that stores the program may be a non-transitory recording medium such as a CD-ROM.

In addition, the recording medium also includes an internal or external recording medium that can be accessed from a distribution server to distribute the program. A configuration may be used in which the program is divided into a plurality of programs, downloaded at different timings from each other, and then combined with each configuration of the information processing apparatus 10, or distribution servers for distributing the respective divided programs may be different. Further, the "computer-readable recording medium" includes a medium, which holds the program for a certain period of time, such as a volatile memory (RAM) inside the computer system that serves as a server or a client in a case in which the program is transmitted via the network. The above-described program may be a program for realizing a part of the above-described functions. Further, the program may be a so-called difference file (difference program) in which the above-described functions can be realized in combination with the program already recorded in the computer system.

A part or all of the functions of the information processing apparatus 10 in the above-described embodiments may be realized by an integrated circuit such as a large scale integration (LSI). Each of the functions may be individually realized as a processor, and a part or all of the functions may be integrated into a processor. A method of achieving the integrated circuit is not limited to the LSI, and may be realized by a dedicated circuit or a general-purpose processor. In a case in which advances in a semiconductor technique lead to appearance of an integrated circuit technique that replaces the LSI, an integrated circuit based on the technique may be used.

DESCRIPTION OF SYMBOLS 10 information processing apparatus
101 first chassis
102 second chassis
103 hinge mechanism
11 communication unit
12 RAM
13 storage unit
14 speaker
15 display unit
16 camera
150 display
155 touch sensor
161 first acceleration sensor
162 second acceleration sensor
17 hall sensor
18 control unit
19 external connection terminal
181 operation information acquisition unit
182 icon display processing unit
183 display selection processing unit
184 layout selection processing unit
185 display layout change unit

What is claimed is:

1. An information processing apparatus comprising:
a bendable display;
a touch sensor configured to detect a touch operation on a screen area of the display;
a memory configured to store a program of an application; and
a processor configured to perform control of arranging and displaying a window of a running application on the screen area of the display by executing the program of the application stored in the memory, wherein
the processor is configured to perform:
an operation information acquisition process of acquiring operation information based on a detection result of the touch sensor,
an icon display process of displaying, in response to a drag operation being started on the window displayed on the screen area of the display, an icon for accepting an operation based on an operation position of the drag operation while continuing the drag operation on the screen area of the display,
an icon display end process of ending display of the icon when the drag operation is completed on the window, and
an icon display continuation process of continuing the display of the icon when the drag operation is completed on the window but is only temporarily interrupted.

2. The information processing apparatus according to claim 1, wherein
the processor is configured to:
perform a determination process of determining whether or not the display is in a bent form,
when it is determined by the determination process that the display is not in the bent form, not execute the icon display continuation process, and end the display of the icon in response to completion of the drag operation on the window, regardless of whether or not the drag operation is temporarily interrupted by the icon display end process, and
when it is determined by the determination process that the display is in the bent form, execute the icon display continuation process to continue the display of the icon until a predetermined time elapses after the drag operation is completed even when the drag operation is completed on the window and to end the display of the icon when the drag operation is not resumed after the predetermined time elapses.

3. The information processing apparatus according to claim 2, wherein the processor is configured to change the predetermined time based on a bending angle of the display that is in the bent form.

4. The information processing apparatus according to claim 1, wherein the processor is configured to control whether or not to execute the icon display continuation process based on a position at which the display is bendable and a current position of the drag operation.

5. The information processing apparatus according to claim 1, wherein in the icon display process, the processor is configured to display the icon at a position based on a start position of the drag operation, and control whether or not to execute the icon display continuation process based on a position at which the display is bendable and the start position of the drag operation.

6. The information processing apparatus according to claim 1, wherein in the icon display process, the processor is configured to display the icon at a position based on a start position of the drag operation, and control whether or not to execute the icon display continuation process based on a position at which the display is bendable, and the start position and an operation direction of the drag operation.

7. The information processing apparatus according to claim 1, wherein while the display of the icon is continued by the icon display continuation process, when an operation is performed on a window different from the window on which the drag operation is performed when the icon is displayed, the processor ends the display of the icon of which the display is continued.

8. The information processing apparatus according to claim 1, wherein the processor is configured to:
perform control of arranging and displaying the window on a screen area of a plurality of displays including an embedded display provided in the information processing apparatus as the display and an external display connected to the information processing apparatus, and in the icon display process, display a first icon for accepting an operation of selecting a display for displaying the window, from among the plurality of displays, as the icon.

9. The information processing apparatus according to claim 8, wherein in the icon display process, the processor is configured to display a second icon from which a display area is selectable for displaying the window within a screen area of a display selected based on the operation on the first icon, as the icon.

10. A control method in an information processing apparatus including a bendable display, a touch sensor configured to detect a touch operation on a screen of the display, a memory configured to store a program of an application, and a processor configured to perform control of arranging and displaying a window of a running application on a screen area of the display by executing the program of the application stored in the memory to cause the processor to perform the control method comprising:

a step of acquiring operation information based on a detection result of the touch sensor;

a step of displaying, in response to a drag operation being started on the window displayed on the screen area of the display, an icon for accepting an operation based on an operation position of the drag operation while continuing the drag operation on the screen area of the display;

a step of ending display of the icon when the drag operation is completed on the window; and a step of continuing the display of the icon when the drag operation is completed on the window but is only temporarily interrupted.

* * * * *